US007313531B2

(12) United States Patent
Chappel et al.

(10) Patent No.: US 7,313,531 B2
(45) Date of Patent: Dec. 25, 2007

(54) METHOD AND SYSTEM FOR QUANTITATIVELY ASSESSING PROJECT RISK AND EFFECTIVENESS

(75) Inventors: Oscar A. Chappel, Tampa, FL (US); Christopher Taylor Creel, Tampa, FL (US)

(73) Assignee: Perot Systems Corporation, Plano, TX (US)

( * ) Notice: Subject to any disclaimer, the term of this patent is extended or adjusted under 35 U.S.C. 154(b) by 1125 days.

(21) Appl. No.: 09/998,474

(22) Filed: Nov. 29, 2001

(65) Prior Publication Data

US 2003/0101089 A1    May 29, 2003

(51) Int. Cl.
*G06F 17/30* (2006.01)
(52) U.S. Cl. .......................................... 705/7
(58) Field of Classification Search .................. 705/7
See application file for complete search history.

(56) References Cited

U.S. PATENT DOCUMENTS

| | | | |
|---|---|---|---|
| 4,684,044 A | 8/1987 | Foster | |
| 4,713,775 A | 12/1987 | Scott et al. | |
| 4,860,213 A | 8/1989 | Bonissone | |
| 4,912,669 A | 3/1990 | Iwamoto et al. | |
| 4,920,499 A | 4/1990 | Skeirik | |
| 4,970,658 A | 11/1990 | Durbin et al. | |
| 5,301,105 A | 4/1994 | Cummings | |
| 5,390,330 A | 2/1995 | Talati | |
| 5,483,443 A | 1/1996 | Milstein | |
| 5,488,714 A | 1/1996 | Skidmore | |
| 5,523,942 A | 6/1996 | Tyler et al. | |
| 5,553,282 A | 9/1996 | Parrish et al. | |
| 5,577,169 A | 11/1996 | Prezioso | |
| 5,619,709 A | 4/1997 | Caid | |
| 5,671,360 A | 9/1997 | Hambrick et al. | |
| 5,724,488 A | 3/1998 | Prezioso | |

(Continued)

FOREIGN PATENT DOCUMENTS

| | | |
|---|---|---|
| JP | 03-020866 | 1/1991 |
| JP | 2000-250888 | 9/2000 |
| JP | 2001-022729 | 1/2001 |

OTHER PUBLICATIONS

Ali et al"The Production of Accurate Construction Cost Estimates in Saudi Arabia"; Aug. 1992; Cost Engineering v34n8 pp. 15-24; Dialog file 15, Accession No. 00628958.*

(Continued)

*Primary Examiner*—Romain Jeanty
(74) *Attorney, Agent, or Firm*—Winstead PC

(57) ABSTRACT

A method and system for assessing risk of a change proposal on a project development, and effectiveness of a service provider to satisfy a client. The method for assessing risk may include receiving the change proposal requesting one or more amendments to be performed on the project. One or more elements of the project potentially affected upon the change proposal being approved may be identified based on the amendment(s) of the change proposal. Metric(s) indicative of the potential effects on the project based on the identified element(s) may be generated. The method for determining effectiveness may include receiving change proposals. A frequency of receipt of the change proposals being received during the course of the project may be monitored to determine effectiveness of the service provider in satisfying the client.

19 Claims, 24 Drawing Sheets

U.S. PATENT DOCUMENTS

| | | |
|---|---|---|
| 5,724,983 A | 3/1998 | Selker |
| 5,765,140 A * | 6/1998 | Knudson et al. ............... 705/9 |
| 5,772,585 A | 6/1998 | Lavin |
| 5,784,635 A | 7/1998 | McCallum |
| 5,794,178 A | 8/1998 | Caid |
| 5,809,476 A | 9/1998 | Ryan |
| 5,809,493 A | 9/1998 | Ahamed et al. |
| 5,819,228 A | 10/1998 | Spiro |
| 5,826,239 A | 10/1998 | Du et al. |
| 5,835,897 A | 11/1998 | Dang |
| 5,890,129 A | 3/1999 | Spurgeon |
| 5,903,453 A | 5/1999 | Stoddard II |
| 5,908,383 A | 6/1999 | Brynjestad |
| 5,916,818 A | 6/1999 | Irsch |
| 5,924,074 A | 7/1999 | Evans |
| 5,930,798 A | 7/1999 | Lawler et al. |
| 5,956,689 A | 9/1999 | Everhart, III |
| 5,960,196 A | 9/1999 | Carrier, III et al. |
| 6,049,794 A | 4/2000 | Jacobs |
| 6,061,506 A | 5/2000 | Wollaston et al. |
| 6,067,466 A | 5/2000 | Selker |
| 6,067,541 A | 5/2000 | Raju et al. |
| 6,073,107 A | 6/2000 | Minkiewicz et al. |
| 6,082,776 A | 7/2000 | Feinberg |
| 6,088,677 A | 7/2000 | Spurgeon |
| 6,101,481 A | 8/2000 | Miller et al. |
| 6,115,646 A | 9/2000 | Fiszman et al. |
| 6,125,350 A | 9/2000 | Dirbas |
| 6,137,911 A | 10/2000 | Zhilyaev |
| 6,151,585 A | 11/2000 | Altschuler et al. |
| 6,161,113 A * | 12/2000 | Mora et al. ................. 715/505 |
| 6,182,047 B1 | 1/2001 | Dirbas |
| 6,266,645 B1 | 7/2001 | Simpson |
| 6,272,678 B1 | 8/2001 | Imachi et al. |
| 6,278,977 B1 | 8/2001 | Agrawal et al. |
| 6,279,042 B1 | 8/2001 | Ouchi |
| 6,292,771 B1 | 9/2001 | Haug |
| 6,311,173 B1 | 10/2001 | Levin et al. |
| 6,314,556 B1 | 11/2001 | DeBusk |
| 6,336,217 B1 | 1/2002 | D'Anjou et al. |
| 6,347,329 B1 | 2/2002 | Evans |
| 6,353,817 B1 | 3/2002 | Jacobs |
| 6,366,683 B1 | 4/2002 | Langlotz |
| 6,370,511 B1 | 4/2002 | Dang |
| 6,381,576 B1 | 4/2002 | Gilbert |
| 6,381,610 B1 * | 4/2002 | Gundewar et al. ........ 707/104.1 |
| 6,411,936 B1 | 6/2002 | Sanders |
| 6,415,295 B1 | 7/2002 | Feinberg |
| 6,430,538 B1 | 8/2002 | Bacon et al. |
| 6,484,178 B1 | 11/2002 | Bence, Jr. et al. |
| 6,493,731 B1 | 12/2002 | Jones et al. |
| 6,551,266 B1 | 4/2003 | Davis |
| 6,556,964 B2 | 4/2003 | Haug |
| 6,578,006 B1 | 6/2003 | Saito et al. |
| 6,581,040 B1 * | 6/2003 | Wright et al. ................. 705/7 |
| 6,594,673 B1 | 7/2003 | Smith et al. |
| 6,611,726 B1 | 8/2003 | Crosswhite |
| 6,715,130 B1 | 3/2004 | Eiche et al. |
| 6,725,287 B1 | 4/2004 | Loeb et al. |
| 6,879,959 B1 | 4/2005 | Chapman et al. |
| 6,901,372 B1 * | 5/2005 | Helzerman ................. 705/7 |
| 6,904,454 B2 | 6/2005 | Stickler |
| 6,999,959 B1 | 2/2006 | Lawrence et al. |
| 7,031,930 B2 * | 4/2006 | Freeman et al. ............... 705/9 |
| 7,092,895 B2 | 8/2006 | Chappel et al. |
| 2001/0018739 A1 | 8/2001 | Anderson |
| 2001/0034621 A1 | 10/2001 | Kirsh et al. |
| 2001/0037224 A1 | 11/2001 | Eldridge et al. |
| 2001/0041992 A1 | 11/2001 | Lewis |
| 2001/0051879 A1 | 12/2001 | Johnson |
| 2001/0051880 A1 | 12/2001 | Schurenberg |
| 2002/0007284 A1 | 1/2002 | Schurenberg |
| 2002/0010595 A1 | 1/2002 | Kapp |
| 2002/0022972 A1 | 2/2002 | Costello |
| 2002/0035486 A1 | 3/2002 | Huyn |
| 2002/0035491 A1 | 3/2002 | Dombroski |
| 2002/0040359 A1 | 4/2002 | Green et al. |
| 2002/0046346 A1 | 4/2002 | Evans |
| 2002/0052551 A1 | 5/2002 | Sinclair |
| 2002/0052760 A1 | 5/2002 | Munoz |
| 2002/0052858 A1 | 5/2002 | Goldman et al. |
| 2002/0069056 A1 | 6/2002 | Nofsinger |
| 2002/0069057 A1 | 6/2002 | Kapust |
| 2002/0069079 A1 | 6/2002 | Vega |
| 2002/0069085 A1 | 6/2002 | Engel |
| 2002/0069089 A1 | 6/2002 | Larkin |
| 2002/0070226 A1 | 6/2002 | Liff |
| 2002/0077849 A1 | 6/2002 | Baruch |
| 2002/0077945 A1 | 6/2002 | Leymann et al. |
| 2002/0077994 A1 | 6/2002 | Dombroski |
| 2002/0082825 A1 | 6/2002 | Rowlandson |
| 2002/0087358 A1 | 7/2002 | Gilbert |
| 2002/0087533 A1 | 7/2002 | Norman |
| 2002/0091552 A1 | 7/2002 | Dombroski |
| 2002/0093189 A1 | 7/2002 | Krupa |
| 2002/0099686 A1 | 7/2002 | Schwartz |
| 2002/0100762 A1 | 8/2002 | Liff |
| 2002/0103680 A1 | 8/2002 | Newman |
| 2002/0107452 A1 | 8/2002 | Kwong |
| 2002/0111826 A1 | 8/2002 | Potter |
| 2002/0116466 A1 | 8/2002 | Trevithick et al. |
| 2002/0120466 A1 | 8/2002 | Finn |
| 2002/0124002 A1 | 9/2002 | Su |
| 2002/0128816 A1 | 9/2002 | Haug |
| 2002/0128868 A1 | 9/2002 | Lonski |
| 2002/0138306 A1 | 9/2002 | Sabovich |
| 2002/0138649 A1 | 9/2002 | Cartmell |
| 2002/0147615 A1 | 10/2002 | Doerr |
| 2002/0147617 A1 | 10/2002 | Schoenbaum |
| 2002/0147710 A1 | 10/2002 | Hu |
| 2002/0148893 A1 | 10/2002 | Walsh |
| 2002/0150966 A1 | 10/2002 | Muraca |
| 2002/0156078 A1 | 10/2002 | Cornings |
| 2002/0161606 A1 | 10/2002 | Bennett |
| 2002/0165735 A1 | 11/2002 | Stangel |
| 2002/0165738 A1 | 11/2002 | Dang |
| 2002/0165739 A1 | 11/2002 | Guyan |
| 2002/0169737 A1 | 11/2002 | Armstrong et al. |
| 2002/0169771 A1 | 11/2002 | Melmon |
| 2002/0170565 A1 | 11/2002 | Walker |
| 2002/0173875 A1 | 11/2002 | Wallace |
| 2002/0173971 A1 | 11/2002 | Stirpe |
| 2002/0173987 A1 | 11/2002 | Dang |
| 2002/0173988 A1 | 11/2002 | Dang |
| 2002/0173989 A1 | 11/2002 | Dang |
| 2002/0173992 A1 | 11/2002 | Dang |
| 2002/0174005 A1 | 11/2002 | Chappel |
| 2002/0178161 A1 | 11/2002 | Brezin et al. |
| 2002/0183626 A1 | 12/2002 | Nordstrom |
| 2002/0187772 A1 | 12/2002 | Hyyppa |
| 2002/0188452 A1 | 12/2002 | Howes |
| 2002/0193667 A1 | 12/2002 | McNair |
| 2002/0194221 A1 | 12/2002 | Strong |
| 2002/0195488 A1 | 12/2002 | Walsh |
| 2002/0198885 A1 | 12/2002 | Streepy |
| 2003/0009239 A1 | 1/2003 | Lombardo |
| 2003/0009357 A1 | 1/2003 | Pish |
| 2003/0009359 A1 | 1/2003 | Weidner |
| 2003/0018595 A1 | 1/2003 | Chen |
| 2003/0023473 A1 | 1/2003 | Guyan |
| 2003/0027223 A1 | 2/2003 | Muraca |
| 2003/0028404 A1 | 2/2003 | Herron |
| 2003/0032069 A1 | 2/2003 | Muraca |
| 2003/0032871 A1 | 2/2003 | Selker |

| | | |
|---|---|---|
| 2003/0033169 A1 | 2/2003 | Dew |
| 2003/0036924 A1 | 2/2003 | Rosen |
| 2003/0049701 A1 | 3/2003 | Muraca |
| 2003/0050804 A1 | 3/2003 | Hendershot |
| 2003/0050825 A1 | 3/2003 | Gallivan |
| 2003/0055531 A1 | 3/2003 | Liff |
| 2003/0055679 A1 | 3/2003 | Soll |
| 2003/0060688 A1 | 3/2003 | Ciarniello |
| 2003/0061096 A1 | 3/2003 | Gallivan |
| 2003/0069756 A1 | 4/2003 | Higginbotham |
| 2003/0069760 A1 | 4/2003 | Gelber |
| 2003/0074218 A1 | 4/2003 | Liff |
| 2003/0074226 A1 | 4/2003 | Rostron |
| 2003/0074228 A1 | 4/2003 | Walsh |
| 2003/0078813 A1 | 4/2003 | Haskell et al. |
| 2003/0083903 A1 | 5/2003 | Myers |
| 2003/0130991 A1 | 7/2003 | Reijerse et al. |
| 2003/0149594 A1 | 8/2003 | Beazley et al. |
| 2003/0167184 A1 | 9/2003 | Kole |
| 2003/0191667 A1 | 10/2003 | Fitzgerald et al. |
| 2003/0206379 A1 | 11/2003 | Haskey et al. |
| 2004/0006495 A1 | 1/2004 | Dudley |
| 2004/0073811 A1 | 4/2004 | Sanin |
| 2004/0078247 A1 | 4/2004 | Rowe et al. |
| 2004/0122709 A1 | 6/2004 | Avinash et al. |
| 2005/0102169 A1 | 5/2005 | Wilson |
| 2005/0137912 A1 | 6/2005 | Rao et al. |

OTHER PUBLICATIONS

Ronald "Team Risk Management ", teaches a method that enables a customer and supplier to work together cooperatively, continuously managing risks throughout the lifecycle of a software-dependent development program.*
David et al "A Collaboration in implementing Team Risk Management", SEI Team Risk Management Project, Mar. 1996, pp. 1-59.*
Nashwan "Estimating project and activity duration : a risk management approach using network analysis", Dec. 1998, Construction MAnagement and Economics, pp. 41-48.*
Randal "Techniques for Developing Cost Risk Analysis Models", Dec. 1999, AACE International Transaction, pp. 1-6.*
Mccord, Kent R. et al., "Managing the integraiton Problem in Concurrent Engineering", MIT Sloan School of Management, Aug. 1993, pp. 1-34.
Thomas, Stephen Richard, "An Assessment Tool for Improving Project Team Communications", Dissertation, University of Texas at Austin, Dec. 1996, 80 pages.
Sosa, Manuel E. et al., Understanding the Effects of Product Architecture on Technical Communication in Product Development Organizations, Massachusetts Institute of Technology, Sloan School of Management Working Paper, Aug. 2000 (pp. 1-34).
Allen, Thomas, "Architecture and Communication Among Product Development Engineers", Proceedings of the IEEE Management Society, 2000 (pp. 153-158).
U.S. Appl. No. 10/336,104, filed Jan. 6, 2003, Chappel.
U.S. Appl. No. 10/690,257, filed Oct. 2003, Chappel.
U.S. Appl. No. 10/690,258, filed Oct. 2003, Chappel.
U.S. Appl. No. 09/916,088, filed Jul. 2001, Creel et al.
Digital Business Office Architecture; 2001 The Technical Resource Connection, Inc.; 1 Page.
Tips for Clean Claims for Institutional Providers; 3 Pages.
Health Claims for Equivalent Encounter Information; HCFA Uniform Bill-92 (UB-92), Version 4.1; 28 Pages.
New Area PPO Puts Emphasis on Claims Service; Alan Moorse; Capital District Business Review; 2 Pages.
Object Oriented Programming; A Guide for the Beginniner—from Modula-2 to Java; 9 Pages.
Rules Based Systems Fuzzy Logic Expert Systems Forwards and Backwards Chaining Pattern Matching Imperative and Declarative Programming; Gaurav Sharma et al.; 13 Pages.
AMR Health's —AVS Reimbursement System; 3 Pages.
Introduction; 2 Pages.
Designing an Expert System; 1 Page.
Expert System Architecture; 2 Pages.
Choosing a Problem; 1 Page.
Knowledge Engineering; 1 Page.
Exam-like Questions; 1 Page.
Rules and Expert Systems; 1 Page.
A Simple Example; 2 Pages.
Explanation Facilities; 2 Pages.
More Complex Systems; 1 Page.
An Expert System Shell in Prolog; 4 Pages.
MYCIN: A Quick Case Study; 3 Pages.
Knowledge-Based System; 1 Page.
Expert System; 1 Page.
Inference Engine; 1 Page.
Inference Rule; 1 Page.
Object Code; 1 Page.
Rule-Based Systems; 1 Page.
Forward Chaining Systems; 3 Pages.
Backward Chaining Systems; 2 Pages.
Forwards vs. Backwards Reasoning; 1 Page.
Uncertainty in Rules; 1 Page.
Makridakis, Spyros et al., Forecasting Methods and Applications Third Edition, John Wiley & Sons, 1998, ISBN: 0-471-53233-9.
Turban, Efraim et al., Decision Support Systems and Intelligent Systems—Fifth Edition, Prentice Hall, Inc., 1998, ISBN: 0-13-740937-0.
Bell et al., The Forecasting Report, Sep. 1999.
Armstrong, Scott J., Strategic Planning and Forecasting Fundamentals, 1983, Excerpt from Albert, Kenneth, The Strategic Management Handbook, McGraw Hill.
Armstrong, J. Scott et al., Principles of Forecasting—A Handbook for Researchers and Practitioners, Springer, Apr. 2001, ISBN: 0792374010.
Armstrong, J. Scott et al., Principles of Forecasting—Web Site, Jan. 2001, www.passig.com/pic/ForecastingHandbook.htm.
ForecastPro.com—Home, Product Description and Product Review web pages, Nov. 2000, Retrieved Apr. 15, 2005 from Archive.org.
Hollander, Geoffrey, ForecastPro Presages Data, InfoWorld, Feb. 2000.
Stellwagen, Eric, New Version of Forecast Pro Greatly Expand Capabilities, Performance and East of Use, Business Forecast Systems, Inc., Press Release, Feb. 2000.
Coffee, Peter, Forecast Pro XE Sharpens Users'View, PC Week Labs, Feb. 2000.
Armstrong, Scott J. et al., Forecasting for Marketing, Excerpt from Hooley et al., Quantitative Methods in Marketing, Second Ed, 1999, pp. 92-119.
Delurgio, Steve, Guide to Forecast Pro for Windows, Retrieved from forecast.umkc.edu, Apr. 2005.
Forecast Pro Product Brochure, Retrieved Apr. 19, 2005 from Archive.org—www.forecastpro.com.
Jain, Chaman, Benchmarking Forecasting Software Packages and Systems, Institute of Business Forecasting Research Report 32, Retrieved Apr. 19, 2005 from Archive.org—www.forecastpro.com.
Khairy A.H. Kobbacy et al., "Towards the Development of an Intelligent Inventory Management System", ProQuest, vol. 10, No. 6, 1999, 11 pages.
Walter Reitman et al., "Artificial Intelligence Applications for Business", Ablex Publishing Corporation, Jan. 1984, pp. 114-118, 135-137.
Evelina Lamma et al., "AI IA 99: Advances in Artificial Intelligence", Sep. 1999, pp. 25-34, 36.
Jae K. Shim, "The Complete Guide to Forecasting Real World Company Performance: Strategic Business Forecasting", CRC Press, 2000, pp. 131-139, 141-145, 147-158, 267.
Derek Partridge et al., "Artificial Intelligence: Business Management", Ablex Publishing Corporation, 1992, pp. 154-158, 185-188, 197-198, 279, 282-285, 298.
K. S. Leung et al., "Fuzzy Concepts in Expert Systems", IEEE, vol. 21, No. 9, Sep. 1988, pp. 43-56.
H. C. Harrison et al., "An Intelligent Business Forecasting System", Proceedings of the 1993 ACM Conference on Computer Science, 1993, pp. 229-236.

"Autobox 5.0 For Windows: User's Guide & Reference Guide", Dec. 10, 1999, pp. 1-65.

"Smart Software: Enterprise Forecasting Solutions", May 2000-Jul. 2001, pp. 1-36.

Bryan Marvin, "Predicting the Future Proves Easy with Forecast Pro Planner (Software Review)", PC Week, vol. 4, No. 35, Sep. 1, 1987.

Juan C. Nogueira et al., "A Formal Risk Assessment Model for Software Evolution", US Army Research Office under grant #38690-MA & grant #40473-MA.

Michael K. Daskalantonakis, "A Practical View of Software Measurement and Implementation Experiences Within Motorola", IEEE Transactions on Software Engineering, vol. 18, No. 11 Nov. 1992, pp. 998-1010.

Edward F. Weller, "Using Metrics to Manage Software Projects", IEEE, Sep. 1994, pp. 27-33.

Dick B. Simmons et al., "Software Measurement: A Visualization Toolkit for Project Control and Process Improvement", Prentice Hall, Nov. 1997, ISBN-0-13-840695-2.

"Caliber—Requirements Management (RM)", Http://web.archive.org/web/20000304023307/www.tbi.com/calibemm/index.html.

H.P. Schultz, "Software Management Metrics", Miltre Corp. Report No. M88-1, May 1988 (abstract).

Karl E. Wiegers, "Automating Requirements Management", Process Impact, 1999, pp. 1-6.

Bruce Abbott, "Requirements Set the Mark", Info World, Mar. 5, 2001, pp. 45-46.

Andy Feibus, "Manage Your Projects's Requirements", Information Week, Oct. 19, 1998, pp. 100-108.

QSS Delivers Industry's First Enterprise-Wide Requirements Management Suite for E-Business, QSS News Archive, Mar. 22, 2000.

D. W. Cordes, "Evaluation Method for User Requirements Documents", Information and Software Technology, May 1989, vol. 31, issue 4, pp. 181 (8 pages) (abstract).

J. Gyorkos, "Measurements in Software Requirements Specification Process", Microprocessing and Microprogramming, Dec. 1994, vol. 40, issue 10-12, p. 893 (4 pages) (abstract).

Rita Jean Costello, "Metrics for Requirements Engineering", California State University, 1994, 211 pages (abstract).

Jeanne Minahan Robinson, "Risk Assessment in Software Requirements Engineering: an Event Driven Framework", George Mason University, 1995, 177 pages (abstract).

Donald M. York, "An Early Indicator to Predict Requirements Volatility", George Mason University, 2001, 235 pages (abstract).

D. Pfahl et al., "Using Simulation to Analyze the Impact of Software Requirement Volatility on Project Performance", Information and Software Technology, Nov. 15, 2000, vol. 42, Issue 14, p. 1001.

Capers Jones, "Strategies for Managing Requirements Creep", Software Productivity Research, Jun. 1996, pp. 92-94.

Adam A. Porter et al., "Empirically Guided Software Development Using Metric-Based Classification Trees", IEEE Software, Mar. 1990, pp. 46-54.

Max Lupul, "Forecast Pro for Windows, Version 1.1: What Does it Do?", Journal of Services Marketing, vol. 7, No. 4, 1993, pp. 67-69.

John T. Mentzner et al., "Evaluating a Decision Support Forecasting System", Industrial Marketing Management, vol. 18, 1989, pp. 313-323.

Marco Carrer et al., "An Annotation Engine for Supporting Video Database Population", Multimedia Tools and Applications 5, Kluwer Academic Publishers, 1997, pp. 233-258.

Robert Galzauskas et al., "Information Extraction: Beyond Document Retrieval", Computational Linguistics and Chinese Language Processing, vol. 3, No. 2, Aug. 1998, pp. 17-60.

Gian P. Zarri, "NKRL, a Knowledge Representation Language for Narrative Natural Language Processing", 1996, pp. 1032-1035.

"FastEMC 6.2: UB92 Electronic Claim Submission System", fPTechnologies, Oct. 31, 1999, manual.

R. Shaker et al., "A Rule Driven Bi-Directional Translation System for Remapping Queries and Result Sets Between a Mediated Schema and Heterogeneous Data Sources", pp. 1-5.

Daniel T. Heinze et al., "LifeCode—A Deployed Application for Automated Medical Coding", Al Magazine, Summer 2001, pp. 1-12.

Peter Jackson Benson, "A Field Study of Communication Patterns in an Organization Using the Negopy Computerized Network Analysis Technique", AAT 8728711, 1987, 223 pages (abstract).

Mark Ackerman et al., "Social Activity Indicators: Interface Components for CSCW Systems", Nov. 14-17, 1995, pp. 159-168.

"Chapter Four: Managing Core Competencies of the Corporation", Tactic #17, Organizational Network Mapping, The Advisory Board Company, 1996, pp. 393-410.

Valdis Krebs, "Organizational Network Analysis", Feb. 2001, Orgnet.com.

Economist.com, "The Big Picture", Jan. 4, 2001, Geneva.

Rainer Puittinen et al., "Measuring and Visualizing Information Transfer in Networked . Collaboration", International Journal of Communication Systems, 1999, vol. 12, No. 85, pp. 85-101.

Eero Byckling et al. "Spin-offs from CERN and the Case of TuovlWDM", Technovation, 2000, vol. 20, No. 2, pp. 71-80.

Eero Eloranta et al., "Improved Project Management Through Improved Document Management", Computers in Industry, 2001, vol. 45, pp. 231-243.

Marc A. Smith et al., "Visualization Components for Persistent Conversations", CHI Mar.-Apr. 2001, vol. 3, No. 1, pp. 136-143.

Mikko Vuoikoski, "Making Intercorporate Project Communications Work Solutions for the International Market Place", Single Source OY, pp. 1-13.

Ari-Pekka Hamerl, "Project Management In a long-term and Global One-of-a-Kind Project", International Journal of Project Management, 1997, vol. 15, No. 3, pp. 151-157.

Mokhtar Arnami et al., "Project Management and Communication of Product Development Through Electronic Document Management", Project Management Journal, Jun. 2000, vol. 31, No. 2, pp. 6-19.

David Krackhardt, "Social Networks and the Liability of Newness for Managers", Journal of Organizational Behavior, vol. 3, 1996, pp. 159-173.

Mark D. Morelli et al., "Predicting Technical Communication in Product Development Organizations", IEEE Transactions of Engineering Management, vol. 42, No. 3, Aug. 1995 pp. 215-222.

Ralph Katz et al., "Communication Patterns, Project Performance, and Task Characteristics: An Empirical Evaluation and Integration in an R&D Setting", Organizational Behavior and Human Performance, Apr. 1979, vol. 23, iss. 2, pp. 139 (abstract).

David Krackhardt et al., "Informal Networks: The Company Behind the Chart", Harvard Business Review, Jul. 1993, vol. 74, iss. 4, pp. 104 (abstract).

Stanley Wasserman et al., "Social Network Analysis: Methods and Applications", Cambridge University Press, 1994.

James Gregory Jones, "A Study of Communications Between Subject Matter Experts and Individual Students in Electronic Mail Contexts", Dissertation, University of Texas at Austin, May 2001.

Mehul A. Shah, "ReferralWeb: A Resource Location System Guided by Personal Relations", Massachusetts Institute of Technology, May 1997.

Dick B. Simmons, "Manager Associate", IEEE, Transactions on Knowledge and Data Engineering, vol. 5, No. 3, Jun. 1993, pp. 426-438.

Dick B. Simmons, "A Win-Win Metric Based Software Management Approach", IEEE Transactions on Engineering Management, vol. 39, No. 1 Feb. 1992, pp. 32-41.

Dick B. Simmons, "Communications: A Software Group Productivity Dominator", Software Engineering Journal, Nov. 1991, pp. 454-462.

Ari-Pekka Hameri et al., "Distributed New Product Development Project Based on Internet and World-Wide Web: A Case Study", Product Innovation Management, 1997, vol. 14, pp. 77-87.

Laura Garton et al., "Studying On-Line Social Networks", Chapter Four of "Doing Internet Research", Steven Jones Editor, Sage Publication, 1999, pp. 75-105.

Spyros Makridakis, "Accuracy Measures: Theoretical and Practical Concerns", International Journal of Forecasting, vol. 9, No. 4, Dec. 1993, pp. 527-529.

Raymond A. Paul et al., "Software Metrics Knowledge and Databases for Projected Management", IEEE Transactions on Knowledge and Data Engineering, vol. 11, No. 1, Jan./Feb. 1999, pp. 255-264.

Ching-Seh Wu, "Software Project Plan Tracking Intelligent Agent", Dissertation, Texas A&M University, Dec. 2000.

Mario Alberto Garcia Espinosa, "Intelligent Agents Applied to Software Management", Texas A&M University, Dissertation, Aug. 1997.

Rational RequistiePro: Product Overview, Rational.com, retrieved from Archive.org.

Forecast Pro Product Brochure: Fast, Easy, Accurate Forecasting, Business Forecast Systems, 2000, pp. 1-12.

G. Libert, "The M-Competition With a Fully Automatic Box-Jenkins Procedure", Journal of Forecasting, Jul.-Sep. 1984, vol. 3, No. 3, pp. 325-328.

Pamela Texter, "Automatic Forecasting of Multivariate Time Series", Pennsylvania University, 1986, AAT 8705423, abstract only.

M. Hashem Pesaran et al., "A Generalized R Squared Criterion for Regression Models Estimated by the Instrumental Variables Method", Econometrica, vol. 62, No. 3, May 1994, abstract only.

Leonard Tashman et al., "Automatic Forecasting Software: A Survey and Evaluation", Pennsylvania University, 1986, AAT 8705423, abstract only.

Nagata Yasushi et al., "Comparison of Determination Coefficient Estimators in the Linear Regression Analysis", Hinshitsu, vol. 27, No. 2, 1997, abstract only.

Elvezo Ronchetti, "Regression and Time Series Model Selection", Journal of the American Statistical Association, Sep. 2000, vol. 95, No. 451, pp. 1008-1009.

Chris Chatfield, "Time-Series Forecasting", Chapman & Hall/CRC, Oct. 25, 2000, ISBN: 1584880635.

Allan D. R. McQuarrie et al., "Regression and Time Series Model Selection", World Scientific, Aug. 1998, ISBN: 981023242X.

Belyao Zheng, "Summarizing the Goodness of Fit of Generalized Linear Models for Longitudinal Data", Journal of Statistics in Medicine, vol. 19, No. 10, 2000, abstract only.

Rational RequisitePro—User's Guide Version 4.5, Rational, 1999.

* cited by examiner

METHOD AND SYSTEM FOR QUANTITATIVELY ASSESSING PROJECT RISK AND EFFECTIVENESS

RELATED CASES

This application is related to co-pending U.S. patent application Ser. Nos. 09/760,339, 09/859,320 and 09/916,088, which are incorporated herein by reference.

BACKGROUND

1. Field of the Invention

The present invention relates generally to development projects, and, more particularly, but not by way of limitation, to a method and system for quantitatively assessing risk and effectiveness of the development projects.

2. Background of the Invention

Most business processes can be measured in two ways, efficiency and effectiveness. These two measurements, however, are difficult to measure quantitatively. Traditionally, these two measurements have been performed in a qualitative manner, which includes a manager generally "feeling" that the business process is operating smoothly and that team members of the business process are working in a cohesive manner. The efficiency issue is addressed in the related applications identified hereinabove, but effectiveness, which is the ability for a service provider to meet a specification of acceptance of a customer, has eluded measurement for quantitative assessment.

During a requirements engagement or development project, a customer or client of a service provider is encouraged to recommend changes and to provide formal comments through use of a formal change proposal process. A change proposal is a request from a client to a service provider, or from the service provider itself, for amending or altering a process or product being developed for a client. The change proposal may be in the form of verbal, paper, or electronic communication. By having client feedback, a direct and continuous indication of the acceptance of the requirements specification is provided. The client feedback also provides a mechanism to assess risk that is introduced to the project when the expectations of the client have not been met, and a change proposal is to be adopted. As understood in the art, change proposals are submitted by review team members of the client that have responsibility to review and approve the requirements specification deliverables.

Each change proposal submitted for an element or artifact of a requirements engagement or specification has an obvious direct impact in that each change proposal may generate a unit of work by a member of the project team who implements the change to the specified artifact. Even if the change proposal does not generate a task to modify an artifact, at a minimum, a review of the artifact may be necessary. Additionally, each change proposal may have an indirect impact that is not readily obvious as the indirect impact may have a profound effect on project progress. Traditionally, measuring the indirect impact of a change proposal has been performed qualitatively in that the service provider only has been able to provide risk assessment to the client in a general, non-quantifiable manner. While the change proposals are useful in providing feedback for the service provider in terms of (i) risk and (ii) effectiveness, quantitatively assessing the risk and effectiveness for both the service provider and client is not performed as tools specifically designed for such an application previously have been unavailable.

SUMMARY OF THE INVENTION

To overcome the problem of not being able to quantifiably assess (i) risk and (ii) effectiveness of a development project based on change proposals received by a service provider from a client, a method and system for utilizing the change proposals to assess risk and effectiveness have been developed. The risk may include direct and indirect risk created by the change proposals on the project, including the ability of the service provider independently to amend the project based on the request of the change proposal. By quantitatively assessing risks associated with adopting change proposals, the client is able to make a more informed business decision as to whether or not to pursue the changes specified by the change proposals. The effectiveness may be defined as the ability of the service provider to adequately address concerns of the client for the project and may be quantitatively assessed as a function of the change proposals received. The assessment provides the service provider with the ability to objectively and quantitatively monitor how well concerns of the client are being addressed.

One embodiment for quantitatively assessing risk on a project associated with a change proposal by a client of a service provider includes a method and system for assessing risk. The method includes receiving the change proposal of the client by the service provider. The change proposal may request one or more amendments to be performed on the project being developed by the service provider. One or more elements of the project potentially affected upon the change proposal being approved may be identified based on the amendment(s) of the change proposal. Metric(s) indicative of the potential effects on the project based on the identified element(s) may be generated, where the metric(s) provide an objective risk assessment for the service provider to provide the client.

One embodiment for determining effectiveness of the project development by the service provider for a client includes a method and system for determining the effectiveness. The method includes receiving change proposals from the client by the service provider. The change proposals request amendments to element(s) of the project. A frequency of receipt of the change proposals being received during the course of the project may be monitored. The frequency of the change proposals being received during the course of the project to determine effectiveness of the service provider in the development of the project for the client may be quantitatively evaluated.

Another embodiment for determining effectiveness includes a method and system to determine satisfaction of client expectations of content of the development project by the service provider. The method may include receiving change proposals from the client by the service provider, where the change proposals request amendments to artifact(s) of the project that are content related. A determination may be made as to the artifact being content oriented. A metric as a function of the proposals being directed to the artifact(s) being content oriented may be directed, where the metric may be indicative of the ability of the service provider to satisfy expectations of the client.

BRIEF DESCRIPTION OF THE DRAWINGS

A more complete understanding of the method and apparatus of the principles of the present invention may be obtained by reference to the following Detailed Description when taken in conjunction with the accompanying Drawings wherein.

DETAILED DESCRIPTION OF THE DRAWINGS

Figure 1:
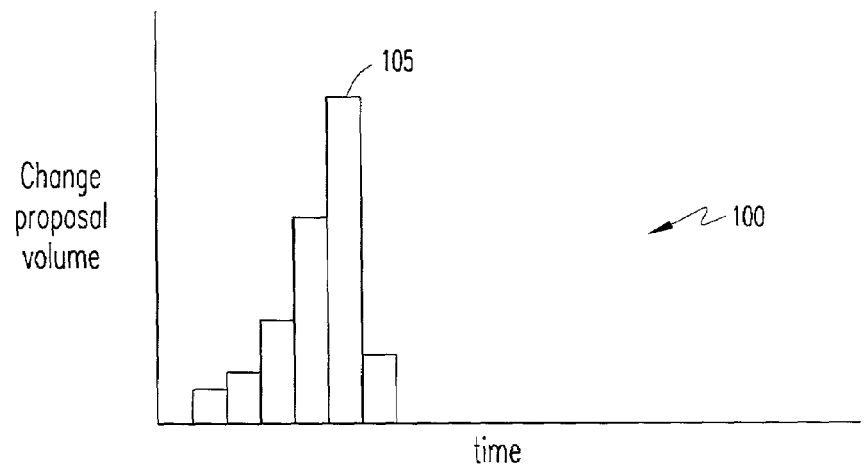
FIG. 1 is an exemplary histogram showing change proposal volume over a project development.

The principles of the present invention will now be described more fully hereinafter with reference to the accompanying drawings, in which embodiments of the principles of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Service providers, such as consultants and contractors (e.g., software developers), generally utilize a formal change proposal system for receiving feedback from clients to modify a project being developed. The change proposals, however, have traditionally been utilized to provide the service provider with qualitative information as to (i) changes to be made to the project and (ii) effectiveness of the ability of the service provider to satisfy the acceptance criteria of the client. The principles of the present invention provide for utilizing the change proposals in combination with knowledge of the project to quantitatively (i) assess the risk associated with adopting and/or implementing a change proposal and (ii) assess the effectiveness of the service provider in satisfying acceptance criteria of the client.

By quantitatively assessing the risk associated with adopting and/or implementing a change proposal, the consultant and client are able to objectively make an informed business decision as to whether or not to adopt the change proposal. The risk assessment may include identifying elements of the project to be potentially affected upon the change proposal being adopted. A metric indicative of the potential effects on the project based on the identified elements of the project may be generated to provide an objective assessment for the service provider to provide the client. The metric may be generated using statistical analyses, including using regression analysis to generate correlation coefficients, for example. In the case of the project being a requirements engagement for generating a requirements specification, the identification of elements may include determining descendants of a branch (e.g., determining subsections of a section in a document) requested to be amended by the change proposal. By identifying the elements that have potential to be affected by the change proposal, tasks that are indirectly attributable to the change proposal may be identified and both direct and indirect risk may be assessed before the change proposal is adopted by the client and the service provider.

Effectiveness of a service provider to satisfy the client is also a desirable factor to quantitatively assess from both the service provider and the client's perspectives. The service provider may be interested in such quantitative information so that client relations may be quantitatively monitored and preserved. The client, too, may desire such quantitative information to monitor the progress of the project being developed and to determine whether the service provider is satisfying the requirements of the client. To determine effectiveness, the change proposals being received may be monitored for frequency of receipt (e.g., the number of change proposals received on a daily or weekly basis) during the course of the project development. The frequency of receipt may be evaluated to quantitatively determine effectiveness of the service provider to satisfy the client. The evaluation may include plotting the frequency or number of change proposals received on a periodic or non-periodic basis on a chart or histogram.

FIG. 1 is an exemplary histogram or chart 100 for displaying frequency of receipt of change proposals during the course of a project, such as a requirements engagement for developing a requirement specification. Conceptually, during the initial states of the requirements project, the customer review team tends to overcome an initial learning curve that is associated with learning the use of change proposal tools available to the customer review team. Generally, initial customer feedback on a requirements specification is slowly developed. Over time, the content of the specification grows and the customer gains confidence in utilizing the change proposal tools. The customer or client tends to submit change proposals on a more frequent basis as the project progresses. As the requirements specification nears completion, client feedback is expected to decline as the service provider responds to the change proposals being fed-back.

A theoretical representation of frequency of the change proposals being received by the service provider is shown in the histogram 100. As shown, the rate of frequency of the change proposals increases to a sharp peak 105 and falls off rapidly thereafter. A chi-squared distribution curve as understood in the art may be used to model the change proposal volume provided in the histogram 100. It is assumed that the customer review team has little or no prior experience using a change proposal system. It is further assumed that the requirements specification is released incrementally.

Figure 2A:
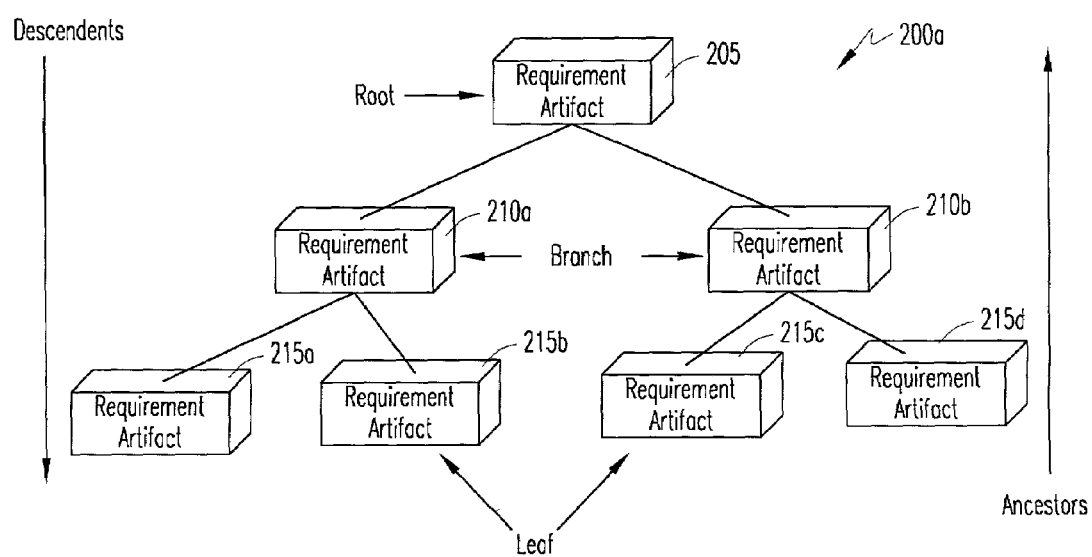
FIG. 2A is an exemplary artifact tree for a requirement specification.

FIG. 2A is an exemplary requirements artifact tree 200a (inverted tree) including a root artifact 205, branch artifacts 210a-210b (collectively), and leaf artifacts 215a-215d (collectively 215). It should be understood that the leaves 215 are descendants of the root 205 and branches 210, and that the root 205 and branches 210 are ancestors of the leaves 215. The root 205, branches 210, and leaves 215 are individual requirement artifacts of the requirements specification.

Figure 2B:
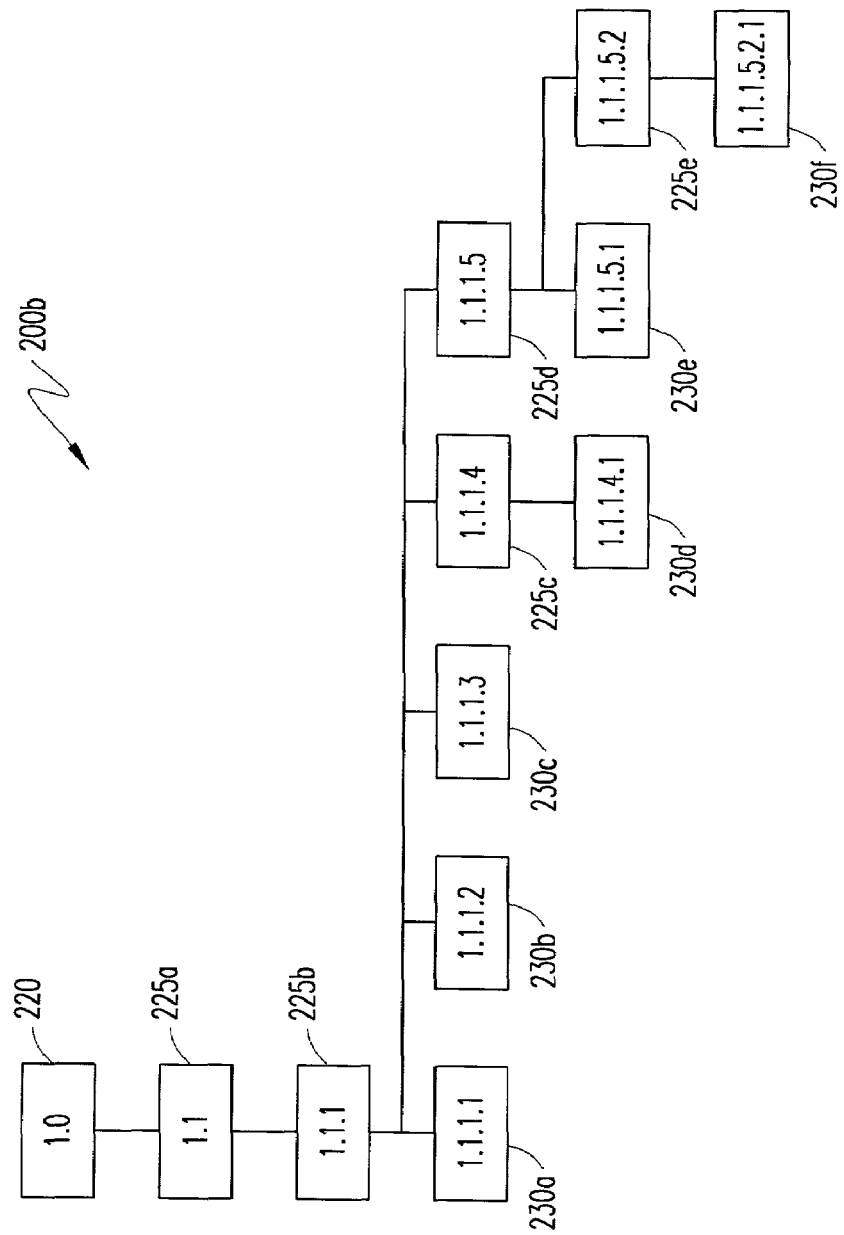
FIG. 2B is an exemplary artifact tree at time $T_1$ for the requirements specification of FIG. 2A.

FIG. 2B is an exemplary tree structure 200b of a requirements specification having sections and subsections defined therein. The section 1.0, identified as a root artifact 220, has subsections 1.1-1.1.1.5.2.1 identified as branches 225a-225e and leaves 230a-230f. As understood in the art, the section and subsections may be utilized to define a process, system or definition for a development project. Although the tree structure 200b shown is exemplary of a specification or other document, it should be understood that other applications that may be modeled using a tree structure may be utilized in accordance with the principles of the present invention. One such application may include a software development project.

Figure 3:
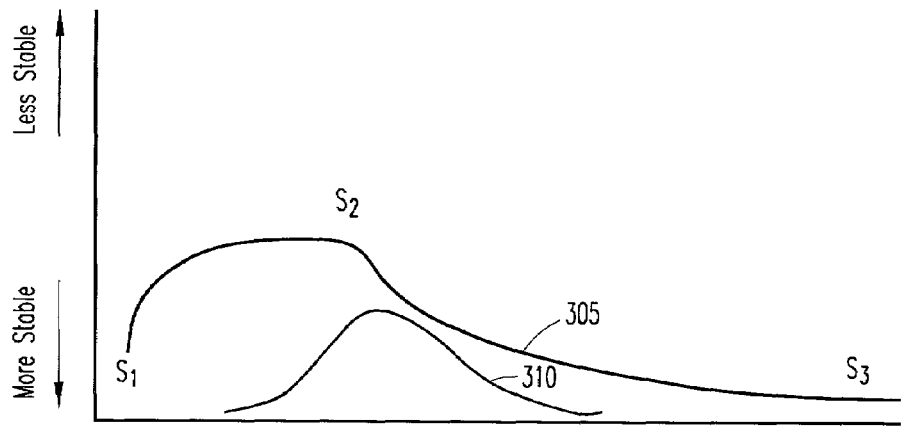
FIG. 3 is an exemplary graph providing a comparison between change proposals in relation to branch stability of the requirements specification of FIG. 2A.

Typically, the structure of a requirements specification, which is embodied by branch requirement artifacts, receives early attention from a requirements development team. For this reason, change proposals are expected to address the specification structure early in the project. As a requirements specification structure (e.g., 200a) reaches stability, modifications of the branch artifacts 210 decline while the age of the branch artifacts 210 increase. FIG. 3 is an exemplary graph showing a branch stability curve 305 representing change proposals in relation to branch stability. Early in the process, between times $S_1$ and $S_2$, branch artifacts 210 have few descendants 215 and modifications to the branch artifacts 210 are expected to have little impact on the project. As structure of the specification develops, the branch stability is shown to be less stable due to the increase in the number of branches and low age of the branches. As the structure continues to stabilize between the time period between $S_2$ and $S_3$, the volume of change proposals that address structure of the tree 200a is expected to decrease. An expected change proposal volume curve 310 represents expected volume for change proposals to be received in relation to the branch stability curve 305. U.S. Pat. Ser. No. 09/760,339, entitled "Method and System for Analyzing and Assessing Progress of a Project" further describes branch artifact stability.

Change proposals may introduce direct and indirect risks as well as potential and actual risks. Reviewers of the requirements specification typically submit change proposals at regular intervals or frequencies during the requirements specification development life cycle. Change proposals are generally directed toward a specific requirements artifact, such as a branch artifact 210. The direct one-to-one relationship between the change proposal and a branch artifact 210, for example, renders assessing the potential direct impact of change proposals as a simplistic exercise. The potential indirect impact of change proposals, however, is more difficult to assess. Further, assessing the actual indirect impact of a change proposal is even more difficult.

Figure 4:
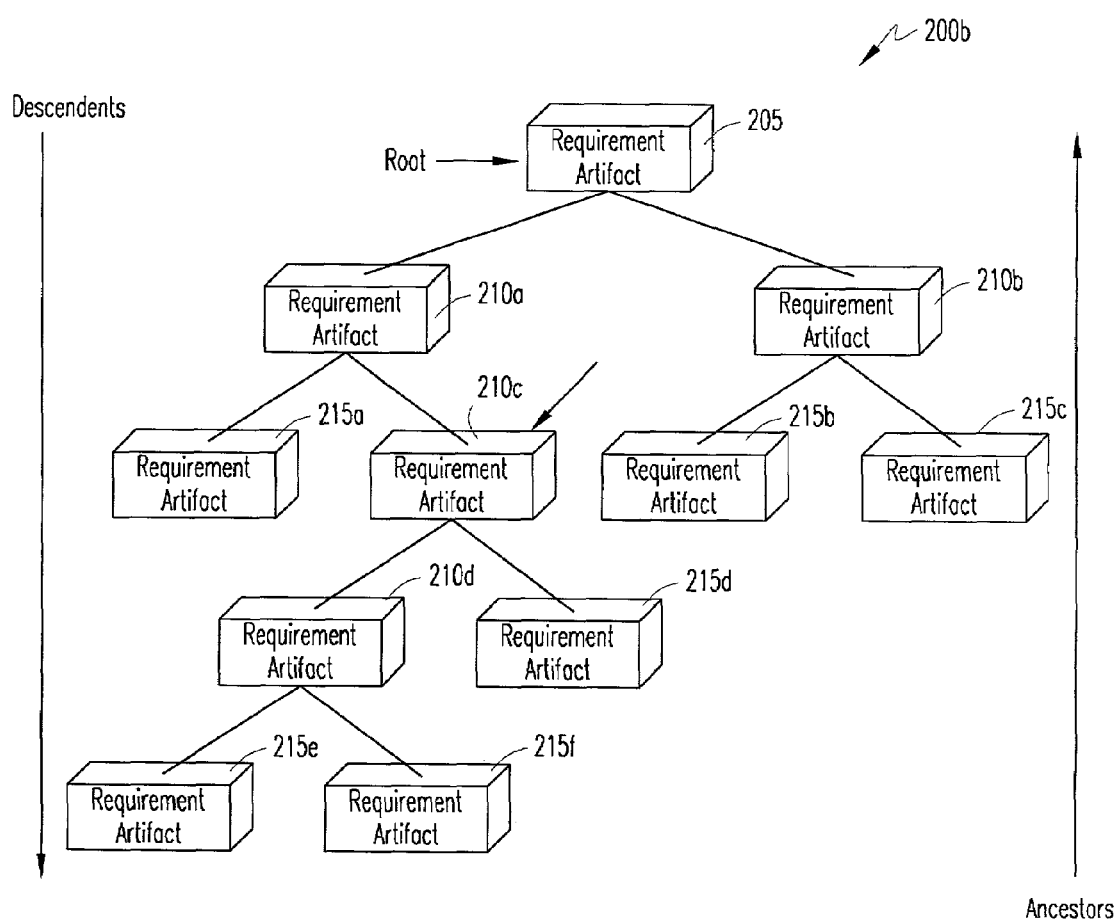
FIG. 4 is the exemplary artifact tree of FIG. 2A at time $T_2$.
Figure 5:
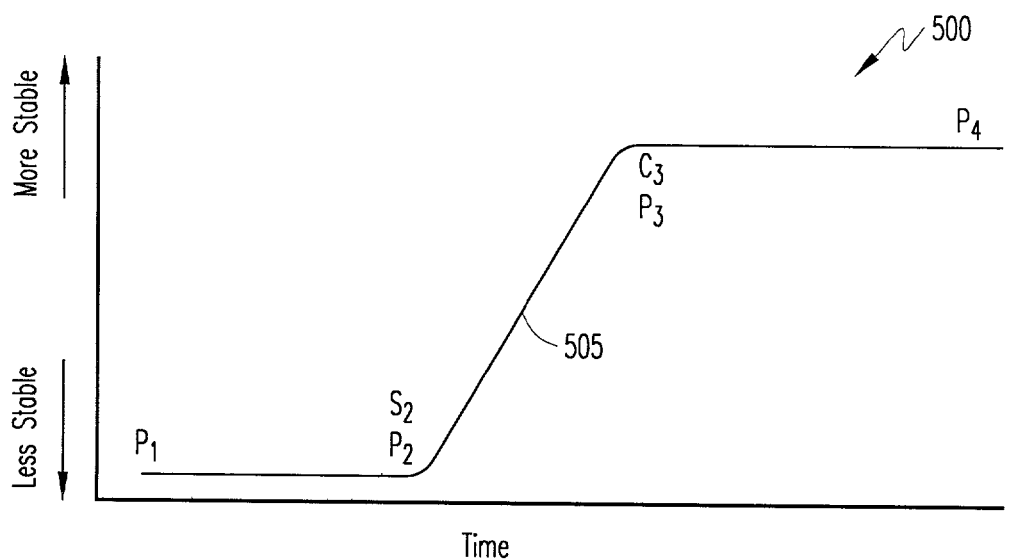
FIG. 5 is an exemplary graph illustrative of content of the project of FIG. 2A increasing as the structure of the project stabilizes.

As the structure of the requirements specification stabilizes between times $S_2$ and $S_3$, the content is expected to grow at a rapid pace as indicated in FIG. 4, which is the exemplary tree structure 200a at time $T_2$. The increase in content, which is the total number of leaves 215a-215f, is reflected in the increase in the number of descendants of the branch artifacts 210. As the number of descendants for each branch 210 increases, the potential indirect risk associated with a change proposal directed to the structure of the tree it 200b increases in proportion to the age of the artifact for which the change proposal is submitted and the number of descendants that may be impacted by the change proposal. The impact over time on potential indirect risk is represented in FIG. 5, which is a graph 500 showing that structure stabilizes as the content increases. A stabilization curve 505 is created by dividing the number of leaves 215 by the number of branches 210. The potential indirect impact and actual indirect impact of change proposals may be measured and provided to client reviewers, thereby providing the reviewers with an objective measure of the feedback value being provided in the form of the change proposals. The actual impact of a change proposal is the measure of process effectiveness.

Figure 6:
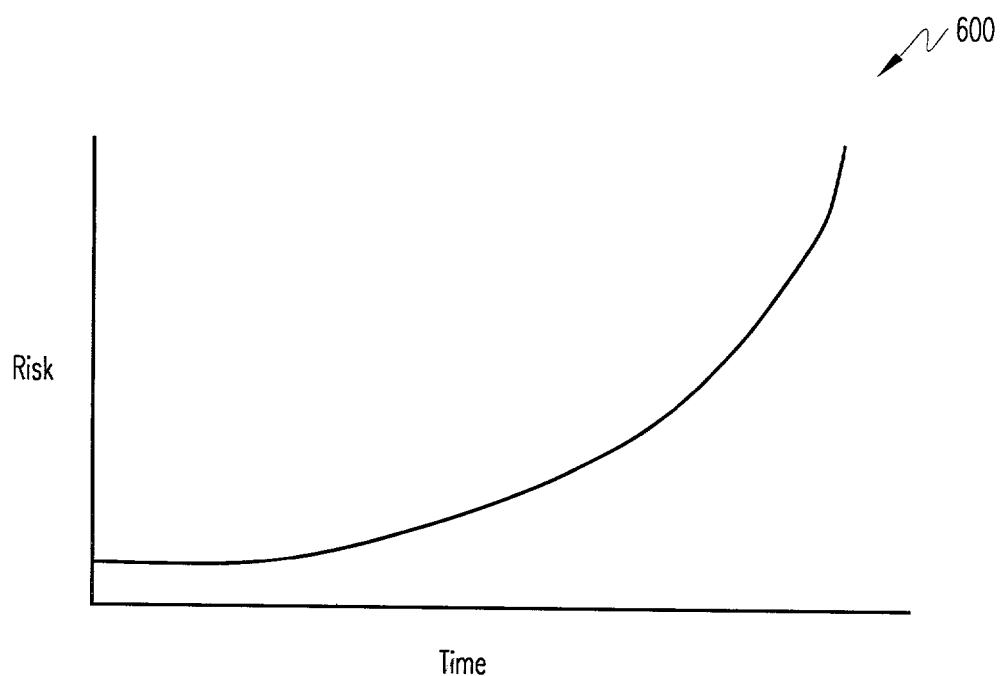
FIG. 6 is an exemplary graph of potential indirect risk of structure changes late in the development of the project of FIG. 2A.

FIG. 6 is an exemplary graph 600 showing potential indirect risk of structure changes late in the development of the project. As shown, because a single change proposal on a branch artifact 210 may impact a large number of branch 210 and leaf 215 descendants, late structural change proposals introduced the highest potential level of risk and have the potential to become a destabilizing factor for the project as a whole. Often, a late structural change proposal may jeopardize the schedule and budget of the project being developed.

Figure 7:
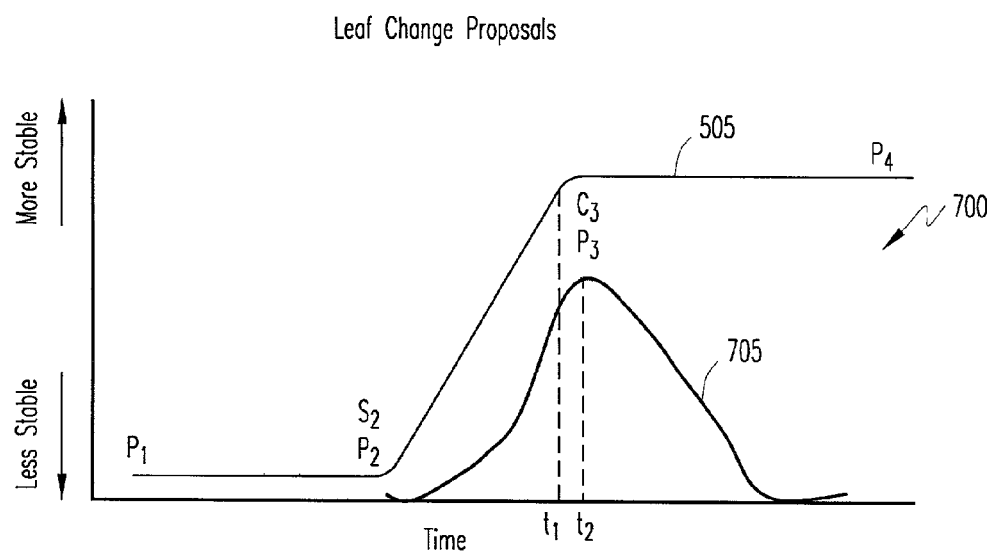
FIG. 7 is an exemplary graph of leaf change proposals for the project of FIG. 2A during development.

FIG. 7 is an exemplary graph 700 including the stabilization curve 505 and leaf change proposal curve 705 for the project. As shown, the leaf change proposal curve 705 begins to increase upon leaves 215 being generated by the service provider. As expected, upon the stabilization curve 505 becoming stable at time $t_1$, the leaf change proposal curve 705 peaks at time $t_2$ and transitions back to zero toward the end of the project as the content stabilizes. It should be understood that since the leaves, which embody the content, have no descendants, there is little or no potential indirect impact for a change proposal directed toward a leaf artifact 215. Because there is little or no potential indirect impact for a change proposal directed toward a leaf artifact 215, the potential risk associated with content oriented change proposals is directly proportional to the number of content oriented change proposals that are submitted.

To further understand the potential and actual risk that is introduced to a development project by a change proposal, three items may be assessed: (i) first, the potential impact of the change proposal, where the potential impact includes the number of descendants that may be impacted by the change proposal, (ii) second, the number of actual work elements that have been performed on the artifact specified by the change proposal and the descendants of the artifact, and (iii) third, the correlation between the amount of work actually performed on the artifact specified by the change proposal and the amount of work performed on the descendants of the change proposal.

The principles of the present invention further provide for determining a metric indicative of the ability of the service provider to satisfy the expectation of the client by monitoring change proposals directed toward leafs or content of the development project. Change proposals directed toward content are generally provided after the structure of the development project has stabilized, and indicate a disagreement or dissatisfaction with the content rather than a dissatisfaction with the structure of the development project. Consequently, risk from the content-directed change proposals on the overall project is low. The metric, however, is valuable in determining client satisfaction with the content. The metric may be generated by utilizing statistical analysis, including using regression analysis and producing correlation coefficients to determine dependency relationships. Further, an indicator may be produced to provide the service provider with an indication of the satisfaction of the client with respect to content being produced by the service provider.

Figure 8:
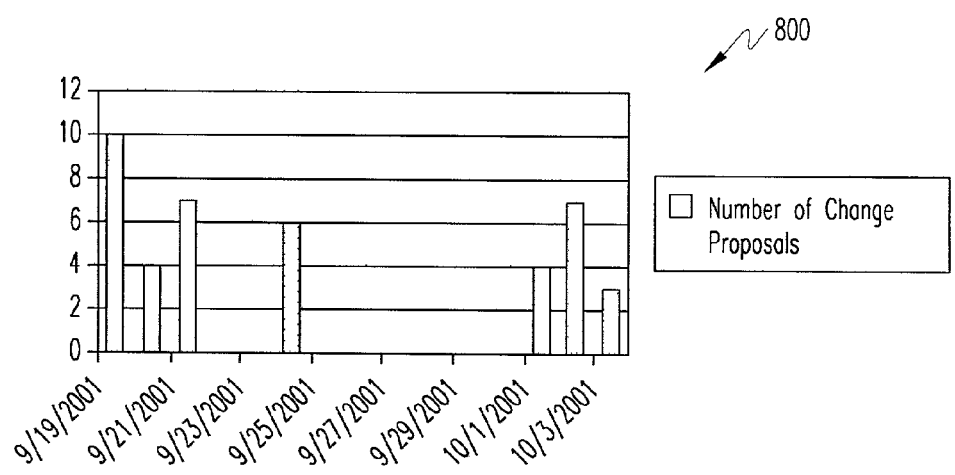
FIG. 8 is an exemplary bar chart representative of change proposals received during the development of the project of FIG. 2A.

Before further discussing the system and method for performing a risk and effectiveness assessment, a presentation and discussion of results of the system and method are provided. FIG. 8 is an exemplary histogram 800 depicting the number of change proposals received on any particular date. Frequency of receipt of change proposals may be determined by the number of change proposals received on a date as provided by the bars on the histogram 800. As shown, on Sep. 19, 2001, ten change proposals were received by the service provider, and on Sep. 21, 2001, four change proposals were received by the service provider. Tracking the number of change proposals received allows a service provider to quantitatively assess the impact of a change proposal and qualitatively assess the effectiveness of the service provider in satisfying the expectations of the client.

Figure 9:
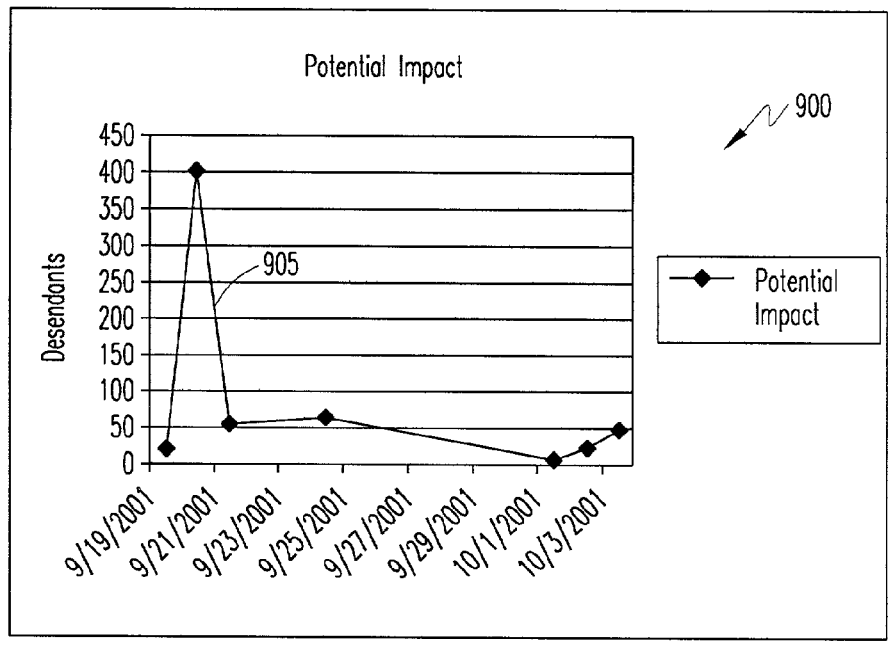
FIG. 9 is an exemplary graph of potential impact on the project of FIG. 2A based on the change proposals received in FIG. 8.

FIG. 9 is an exemplary graph 900 indicating the potential impact on the project based on the number of change proposals received in FIG. 8. On each date, a number of descendants of artifacts toward which the change proposals are directed are counted for that particular date. For example, on Sep. 21, 2001, the number of descendants of the artifacts toward which the four change proposals were directed was four-hundred (i.e., 400).

Figure 10:
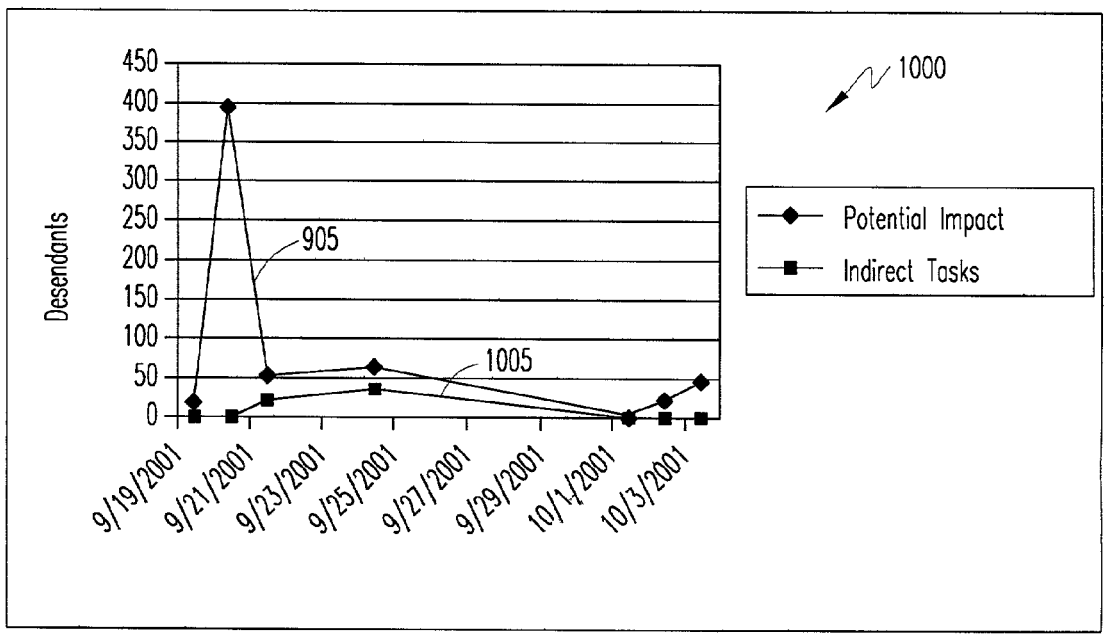
FIG. 10 is an exemplary chart indicative of indirect tasks performed due to the change proposals received in FIG. 8 in relation to potential impact of FIG. 9.

FIG. 10 is an exemplary chart 1000 indicative of indirect tasks performed due to the change proposals of FIG. 8 in relation to potential impact of FIG. 9. To determine indirect impact, the number of tasks that have been performed on descendants of the artifact toward which the change proposals have been directed are counted. To count the number of tasks performed, the individual units of work performed on a daily basis may be recorded for each artifact. The number of tasks performed on the descendants of the artifacts for which one or more change proposals are submitted may be summed. An indirect task curve 1005 may be plotted against the potential impact curve 905 to show the potential impact versus the indirect tasks performed. As shown, on Sep. 21, 2001, the potential impact for work to be performed was 400, but the actual indirect tasks performed was zero. In this case, the change proposals were rejected by the service provider so that the actual indirect tasks to be performed for the change proposals submitted were preemptively eliminated. Also shown, on Sep. 25, 2001, the potential impact was roughly 60, but the actual impact was approximately 45. This result shows that at least one change proposal was rejected by either the service provider or the client based on an assessment of the potential impact resulting from the change proposals. It should be understood that the number of indirect tasks are related back to the date of the change proposals that were submitted so that no lag time results in the indirect task curve 1005 relative to the potential impact curve 905.

Figure 11:
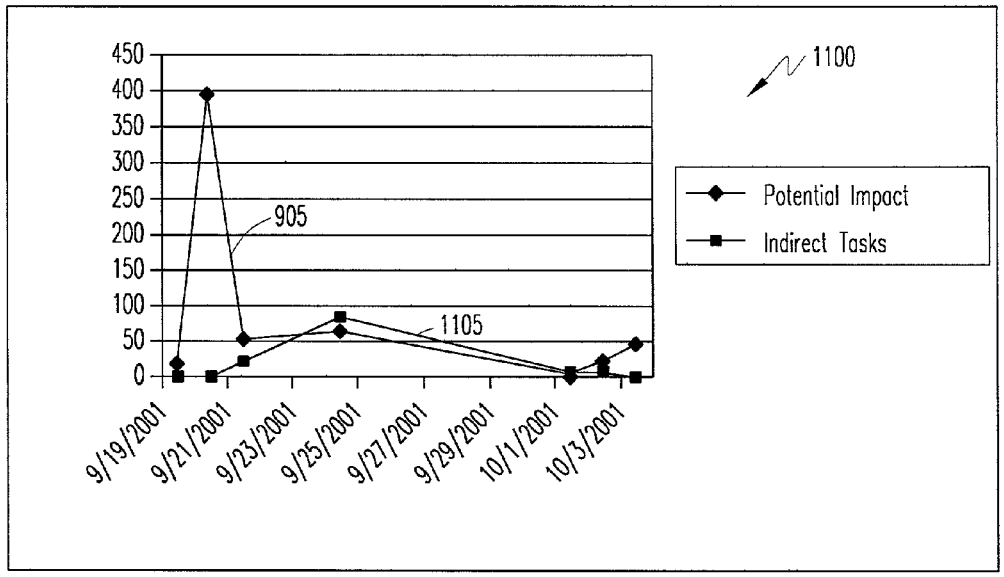
FIG. 11 is an exemplary graph indicating direct tasks performed in response to the change proposals received in FIG. 8 with respect to potential impact of the activities shown in FIG. 9.

FIG. 11 is an exemplary graph 1100 indicating direct tasks performed in response to the change proposals of FIG. 8 with respect to potential impact of the activities shown in FIG. 9. As shown, a direct tasks curve 1105 is plotted against the potential impact curve 905. On Sep. 25, 2001, it is shown that the number of direct tasks exceeded the potential impact, which is likely due to multiple direct tasks being performed for one or more change proposals.

Figure 12:
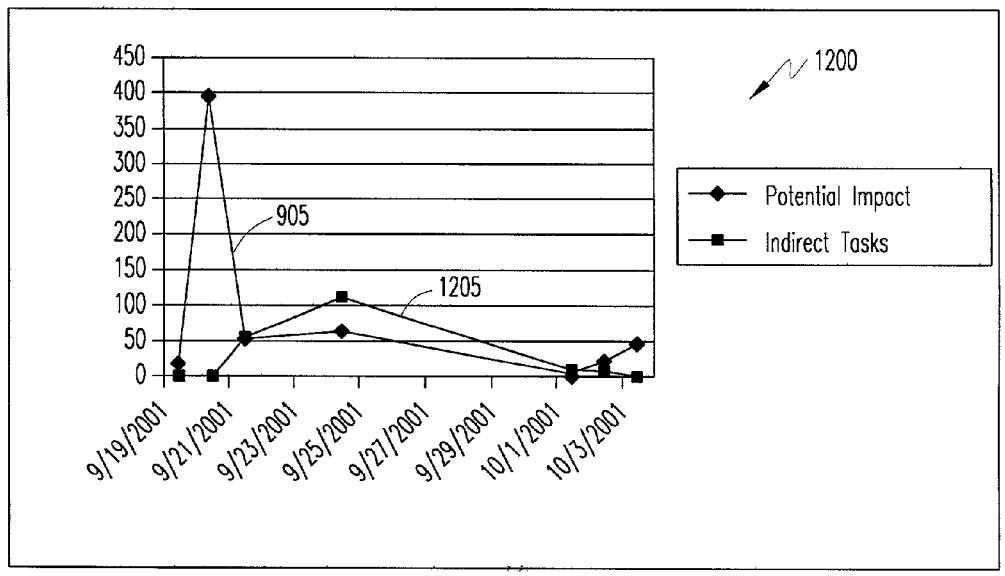
FIG. 12 is an exemplary graph showing actual impact based on the change proposals received in FIG. 8 versus potential impact of the activities shown in FIG. 9.

FIG. 12 is an exemplary graph 1200 showing actual impact based on the change proposals of FIG. 8 versus potential impact of the activities shown in FIG. 9. As shown, an actual impact curve 1205 is plotted against the potential impact curve 905. The actual impact curve is produced by summing up the indirect and direct tasks 1005 and 1105.

A relationship between actual and potential indirect impact may be established using regression analysis. In order to determine the significance of actual and direct impact as in relation to potential indirect impact, a regression model may be used. The correlation coefficient of the regression equation established by using the number of actual indirect changes as the dependent variable, and the number of potential indirect changes as the independent variable may describe the relationship between potential and actual impact.

Figure 13:
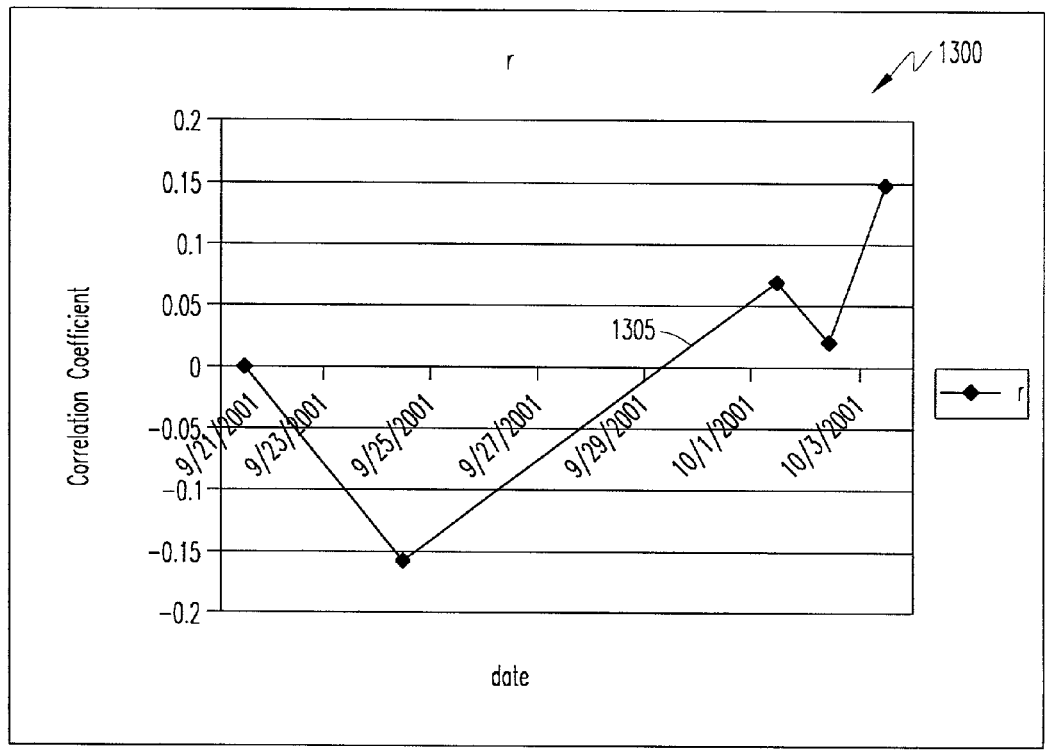
FIG. 13 is an exemplary graph providing metrics indicative of indirectly attributable tasks due to change proposals received in FIG. 8.

A low correlation indicates that the number of artifacts that are actually being modified has a weak relationship to the number of artifacts that have potential to be modified. A weak relationship indicates that volatility of the project is low in that a point of stability may be expected. FIG. 13 is an exemplary graph 1300 providing a metric indicative of indirectly attributable tasks due to the change proposals of FIG. 8. In this example, the metric is a correlation coefficient that is generated by correlating the number of indirectly attributable tasks to the number of change proposals. As shown, the correlation coefficient curve 1305 represents correlation coefficients generated from performing a regression analysis.

Before further discussing the results of the principles of the present invention, one embodiment to perform the statistical analysis is discussed. Regression analysis is used to determine dependency between an independent and a dependent variable. For the instant case, independent and dependent variables may be set to provide a desired analysis of risk, stability, or other information of the development project. In performing the regression analysis, statistical equations are used to perform the regression analysis. The regression analysis includes normal regression model equations (equations 1-3) and further includes (i) slope (equation 4) of the regression model equations, (ii) intercept (equation 5) of the regression model equations, (iii) coefficient of determination (equation 6) of the regression equations, and (iv) an equation for the correlation coefficient (equation 7) of the regression equations. The regression analysis is used to compute the regression parameters, develop models of the relationship between desired variables, and assess the strength of the relationships between the desired variables. The equations are expressed as:

$$S_{XX} = \Sigma X_i^2 - (\Sigma X_i)^2/n \quad (1)$$

$$S_{YY} = \Sigma Y_i^2 - (\Sigma Y_i)^2/n \quad (2)$$

$$S_{XY} = \Sigma XY_i - (\Sigma X_i)(\Sigma Y_i)/n \quad (3)$$

$$b_1 = S_{XY}/S_{XX} \quad (4)$$

$$b_0 = \overline{Y} - b_1 \overline{X} \quad (5)$$

$$R^2 = b_1 S_{XY}/S_{YY} \quad (6)$$

$$r = \frac{\sum (X_i - \overline{X})(Y_i - \overline{Y})}{\left(\sqrt{\sum (X_i - \overline{X})^2} \sqrt{\sum (Y_i - \overline{Y})^2}\right)} \quad (7)$$

Definitions:

$S_{XX}$=The sum of the squares of the independent variable values.

$S_{YY}$=The sum of the squares of the dependent variable values.

$S_{XY}$=The sum of the products of the independent and dependent variable values.

X=The individual values of the independent variables.

X-bar=The mean of the independent variable values.

Y=The individual values of the dependent variables.

Y-bar=The mean of the dependent variable values.

n=The number of (X,Y) pairs.

$b_1$=The slope of the repression equations.

$b_0$=The intercept of the regression equations.

r=The sample correlation coefficient.

$R^2$=The coefficient of determination, the square of the sample correlation coefficient.

Figure 14:
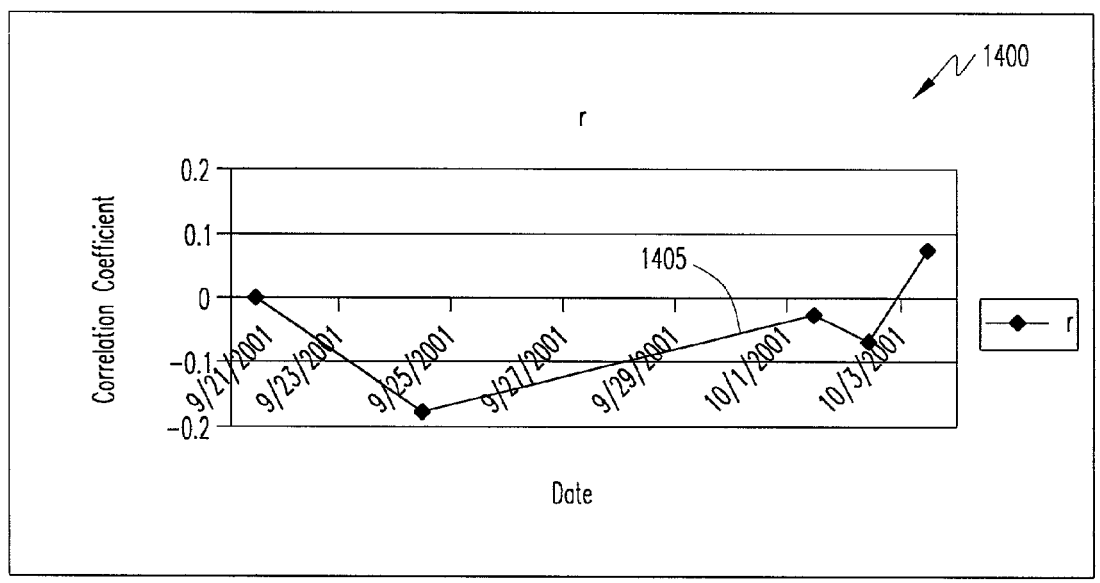
FIG. 14 is an exemplary graph including metrics indicative of directly attributable tasks based on change proposals of FIG. 8.

Because the correlation coefficient is relatively low (i.e., below 0±0.2), the project volatility is low, that is, the relationship between the number of changes performed is weakly attributable to the number of change proposals submitted, and, therefore, risk associated with the change proposals for those particular dates is low. FIG. 14 is an exemplary graph 1400 including metrics indicative of directly attributable tasks based on the change proposals of FIG. 8. The correlation coefficients are the metrics and are shown by the correlation coefficient curve 1405. As the correlation coefficients are below ±0.2, the associated risk with the change proposals is low. It should be understood that other metrics, such as R-squared, may be utilized.

Figure 15:
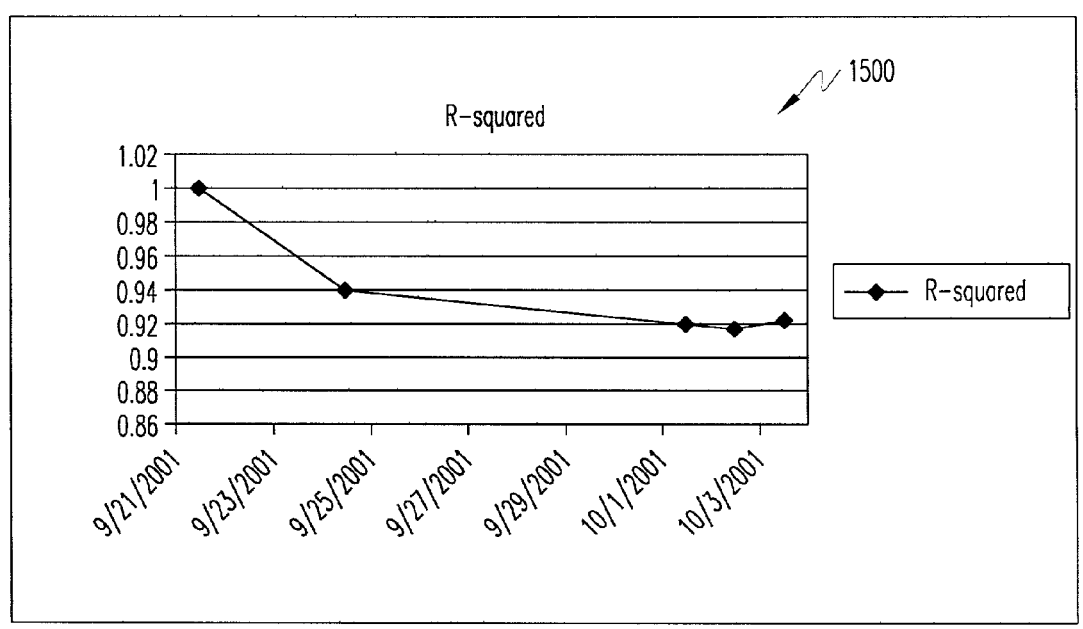
FIG. 15 is an exemplary graph providing metrics based on indirect versus direct tasks.

In general, a high correlation between actual change impact and potential change impact indicates a strong linear relationship. A strong linear relationship may be translated to say that for every potential change there is a strong likelihood that an actual change occurs, and that extreme volatility in the requirement project exists (i.e., a high risk situation). FIG. 15 is an exemplary graph 1500 providing metrics on an indirect versus direct task basis. As shown, R-squared is used as the metric and indicates that the correlation is high, which means that the risk on the project for adopting change proposals is high.

Figure 16:
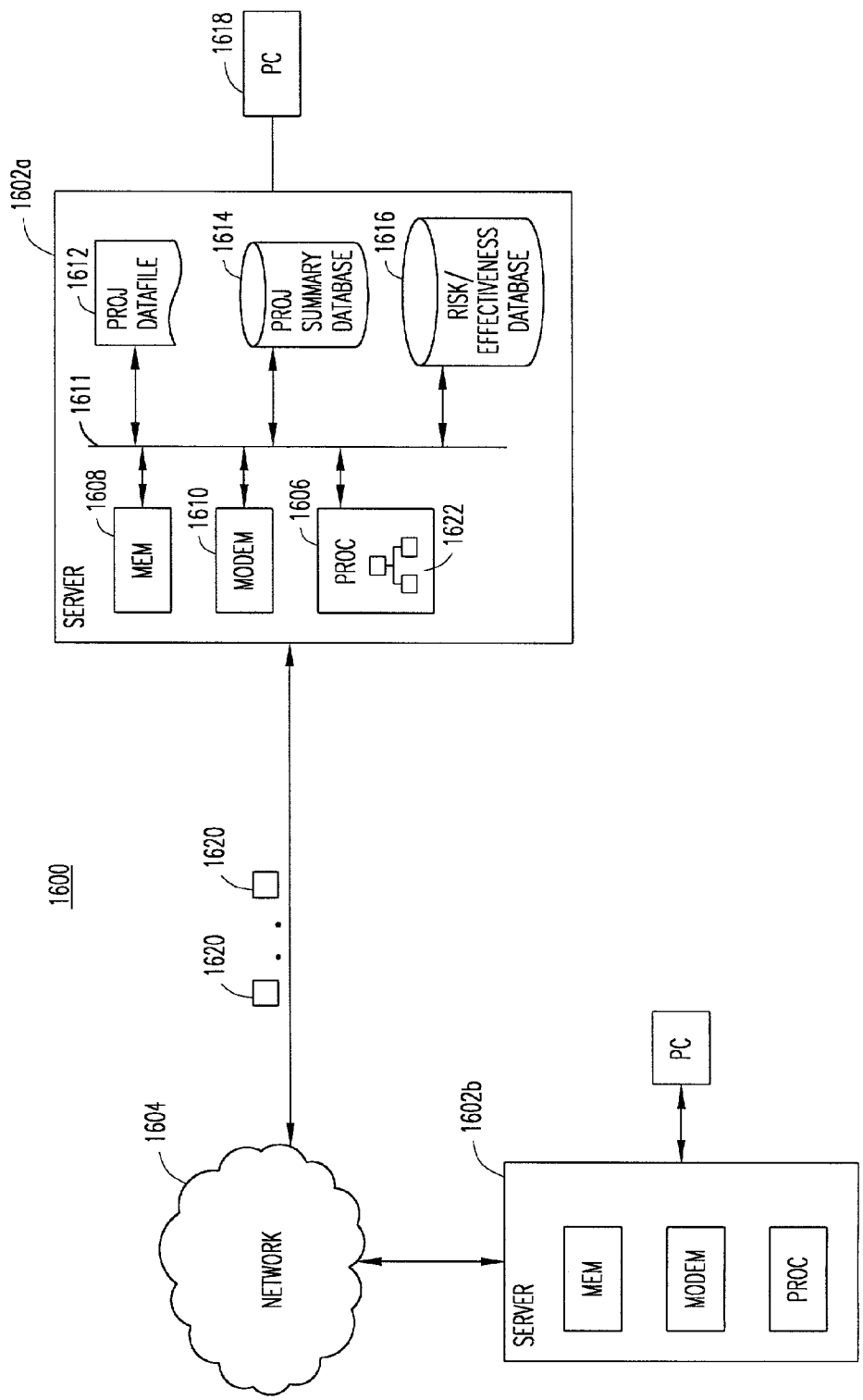
FIG. 16 is an exemplary system for maintaining and performing the principles of the present invention as applied to the development project of FIG. 2A.

FIG. 16 is an exemplary system 1600 for maintaining and performing the principles of the present invention as applied to the development project of FIG. 2A. A service provider server 1602a may be coupled to a client server 1602b via a network 1604, such as the Internet. The service provider server 1602a includes a processor 1606 coupled to a memory 1608 and a modem 1610 via a databus 1611. A project datafile 1612 that includes the artifacts of the development project may be stored in a first storage device containing a project summary database 1614. A second storage device may include a risk/effectiveness database 1616, which stores the results of processing for assessing risk and effectiveness of the project and service provider, respectively. It should be understood that the databases 1614 and 1616 may be maintained in single or multiple databases, and be stored on a single storage device. A computing device 1618, such as a personal computer, may be coupled to the service provider server 1602a for performing the operations to generate the project datafile 1612, project summary database 1614, and risk/effectiveness database 1616. The client server 1602b may contain substantially the same hardware as the service provider server 1602a, and communicate with the service provider server 1602a using data packets 1620 as understood in the art.

In operation, the processor 1606 executes at least one software program 1622 that is utilized by a user to generate the project datafile 1612 and databases 1614 and 1616. Alternatively, the project datafile 1612 may be generated utilizing a processor on the computing device 1618 and uploaded on the service provider server 1602a.

Figure 17:
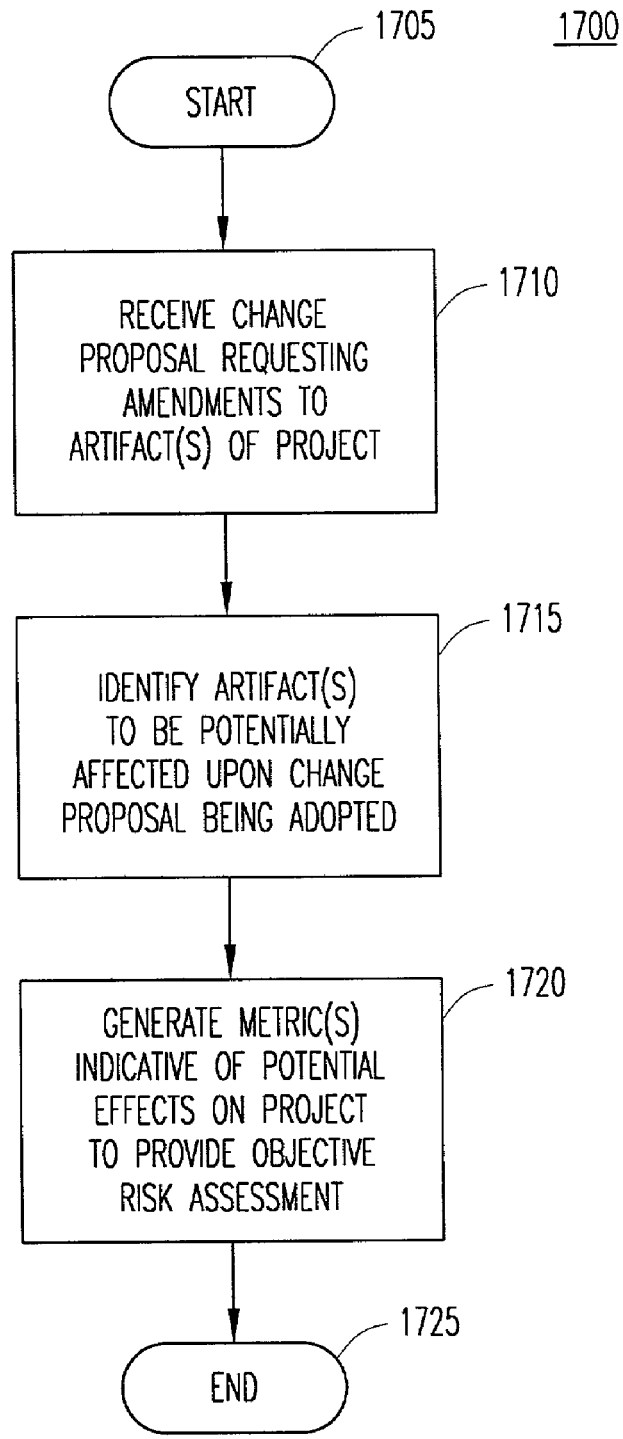
FIG. 17 is an exemplary flow diagram for determining risk assessment according to the principles of the present invention as operated on the exemplary development project of FIG. 2A.

FIG. 17 is an exemplary flow diagram 1700 for determining risk assessment according to the principles of the present invention as operated on the exemplary development project of FIG. 2A. The process starts at 1705. At step 1710, a change proposal requesting amendments to artifact(s) of the project are received by the service provider from the client. The change proposal may request structure or content of the project. In the case of the project being a requirements specification, the change proposal may request that a branch 210 be moved to a different location or that content, such as a description, be amended, potentially for spelling or grammar, for example. At step 1715, artifact(s) to be potentially affected upon the change proposal being adopted are identified. The artifact(s) may be those directly or indirectly affected by the change proposal. In the case of indirectly affected artifacts, descendants of the directly affected artifacts may be identified. At step 1720, metric(s) indicative of potential effects on the project are generated to provide objective risk assessment. The metric(s) may be generated using statistical analysis, such as regression analysis. The process ends at step 1725.

Figure 18:
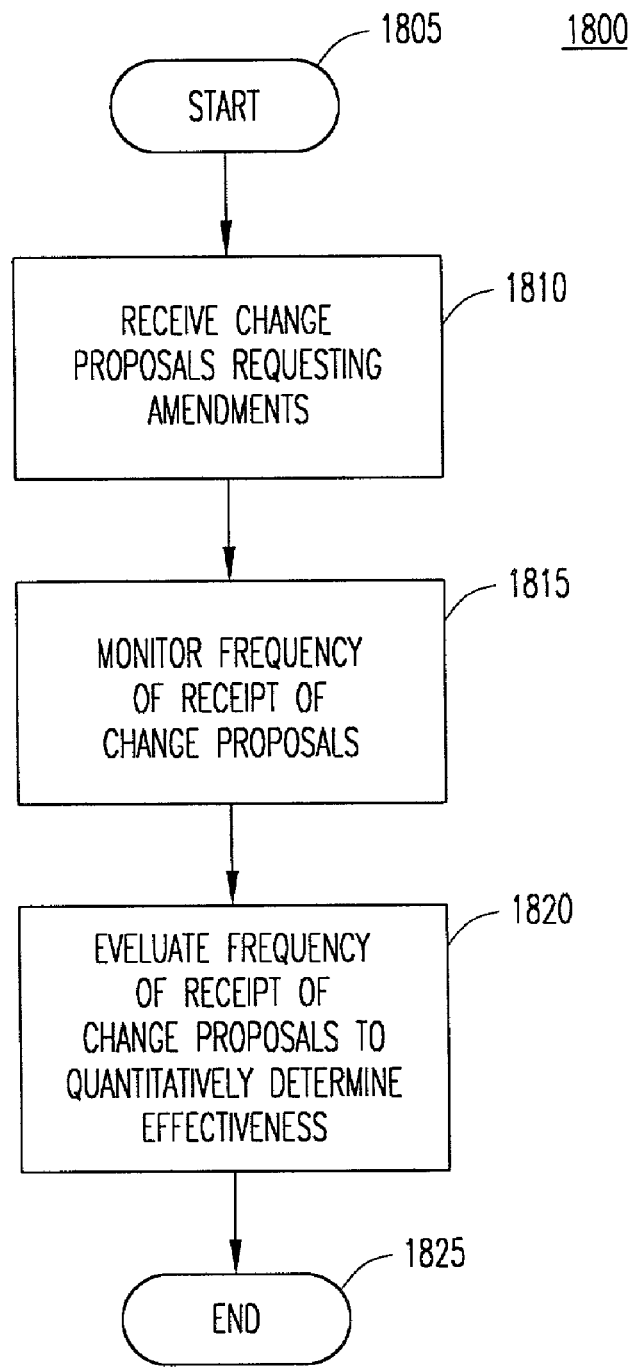
FIG. 18 is an exemplary flow diagram describing effectiveness assessment according to the principles of the present invention as operated on the exemplary development project of FIG. 2A.

FIG. 18 is an exemplary flow diagram 1800 describing effectiveness assessment according to the principles of the present invention as operated on the exemplary development project of FIG. 2A. The process starts at 1805. At step 1810, change proposals requesting amendments are received by the service provider from the client. At step 1815, frequency of receipt of change proposals are monitored. The frequency of receipt of change proposals is monitored to determine, for example, how many change proposals are received on a daily or weekly basis. At step 1820, the frequency of receipt of change proposals are evaluated to quantitatively determine effectiveness of the service provider to satisfy the desires of the client. The process ends at step 1825.

Figure 19:
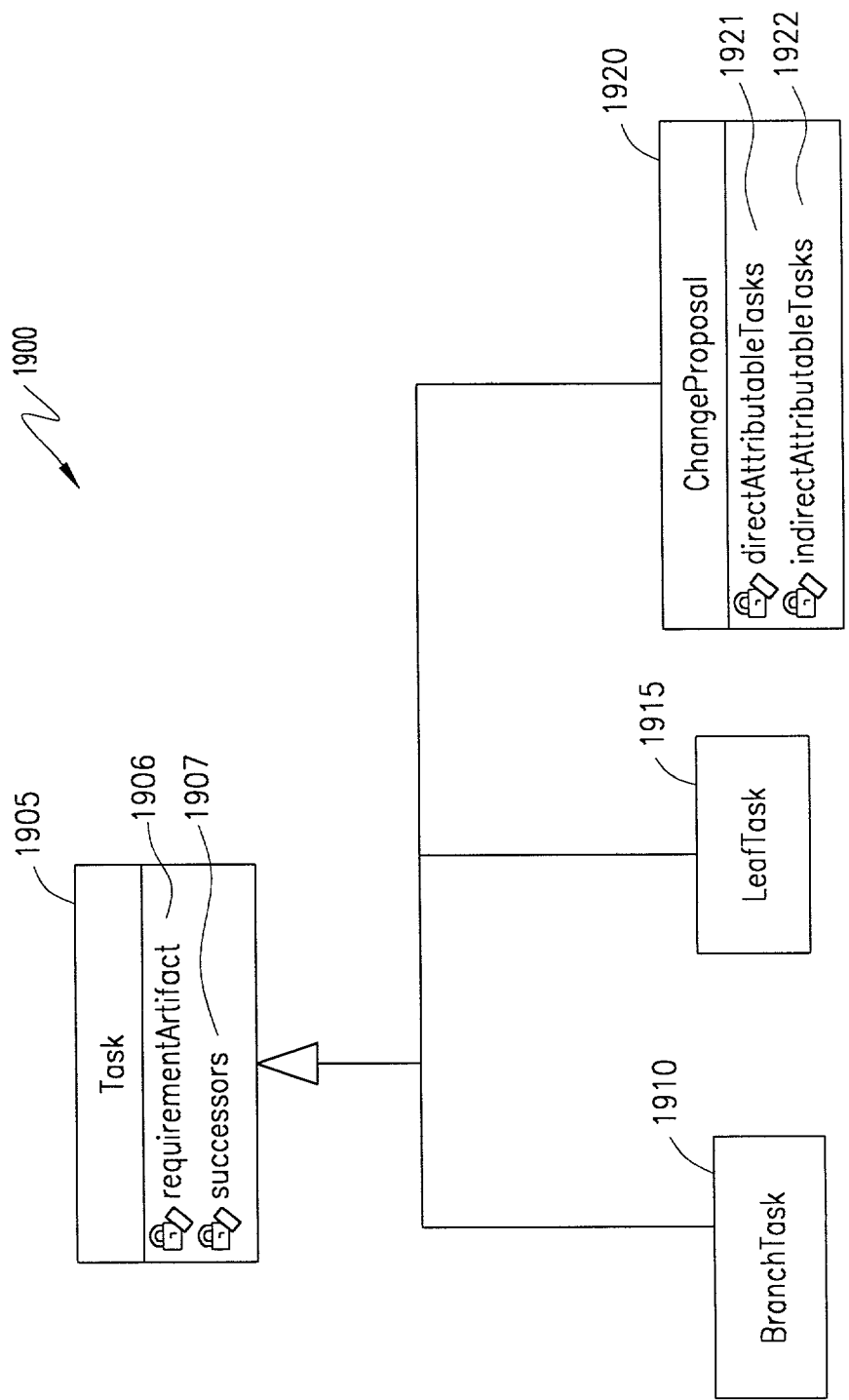
FIG. 19 is an exemplary block diagram of a class structure for implementing the principles of the present invention.

FIG. 19 is an exemplary block diagram of a class structure 1900 for implementing the principles of the present invention. The class structure includes a Task class 1905 containing requirementArtifact 1906 and successors 1907 attributes. The requirementArtifact class 1906 defines particular artifacts that may be identified or modified when performing a task. The successors attribute 1907 may be a list or container of Task objects that are identified for the particular artifact identified by the requirementArtifact 1906 class. BranchTask 1910, LeafTask, and Change Proposal Task 1920 classes are derived from the Task class 1905 that is used to represent a unit of work. The BranchTask class 1910 defines branch work, the LeafTask class 1905 defines leaf work, and the Change Proposal Task class 1920 defines change proposals submitted by the client. The Change Proposal Task class 1920 further includes directAttributableTasks 1921 and indirectAttributableTasks 1922 attributes that contain the tasks actually performed as a direct or indirect result of a given change proposal.

Figure 20A:
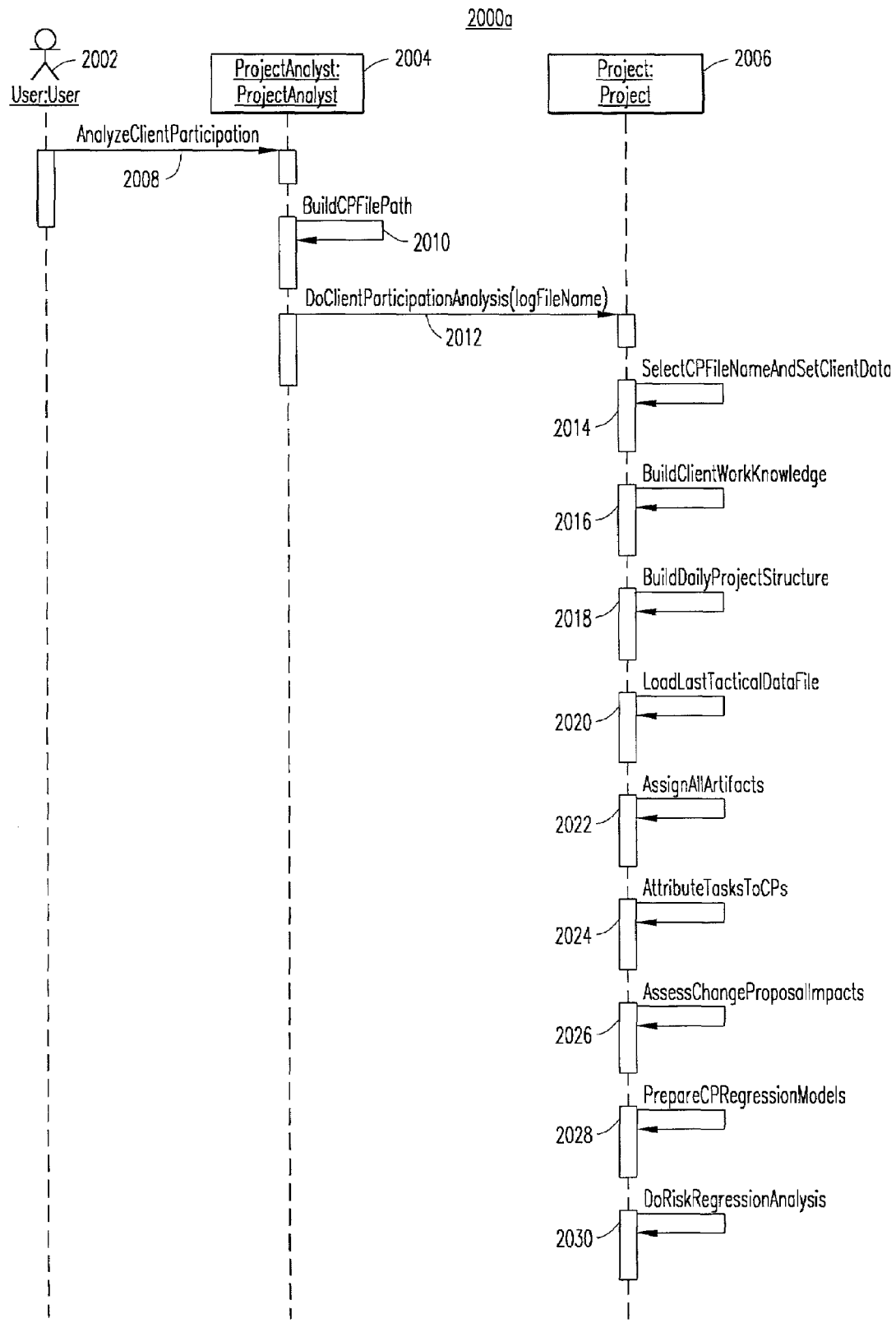
FIG. 20A is an exemplary interaction diagram for implementing the principles of the present invention utilizing the class structure of FIG. 19.

FIG. 20A is an exemplary interaction diagram 2000 for implementing the principles of the present invention utilizing the class structure of FIG. 19 on the processor 1606. The interaction diagram 2000 is a high-level description of particular operations that may be utilized to perform a risk analysis for a particular change proposal. A ProjectAnalyst instance 2004 and Project instance 2006 may be loaded and executed. A user 2002 of the service provider server 1602a may send an AnalyzeClientParticipation method 2008 to the ProjectAnalyst instance 2004. The ProjectAnalyst instance 2004 may determine a change proposal file path at 2010. The ProjectAnalyst instance 2004 may send a message to the Project instance 2006 to analyze the effects of the change proposal.

At 2014, a change proposal file name is selected and client data is set using a method SelectCPFileNameAndSetClientData. Client work knowledge may be generated at 2016. A daily project structure may be built at 2018, where the daily project structure is the structure of the requirements specification in the case of performing a requirements engagement during the project. While the daily project structure may be selectively built to reflect the state of the project on the particular day of the change proposal, a database containing the daily project structures for each day of the project may be maintained, thereby allowing for a simple look-up rather than having to create daily project structures for each analysis.

At 2020, the last tactical datafile that existed is loaded, where the tactical datafile may be a text file containing a listing of all branch and leaf tasks that have been performed, to date. All artifacts, including branch 210 and leaf 215, are assigned or defined as being branches or leaves at 2022. At 2024, potential tasks or work created due to or attributable to the change proposal are identified. An assessment of impact from the change proposal on the project is made at 2026. The assessment may include counting the tasks that were identified at 2024, for both directly and indirectly attributable tasks. At 2028, regression models for the change proposals may be generated by utilizing results from assessing the impacts of the change proposal as parameters for the regression models. A risk regression analysis is performed at 2030 by utilizing the regression models.

FIGS. 20B-20J are exemplary interaction diagrams for performing various aspects of the interaction diagram of FIG. 20A.

Figure 20B:
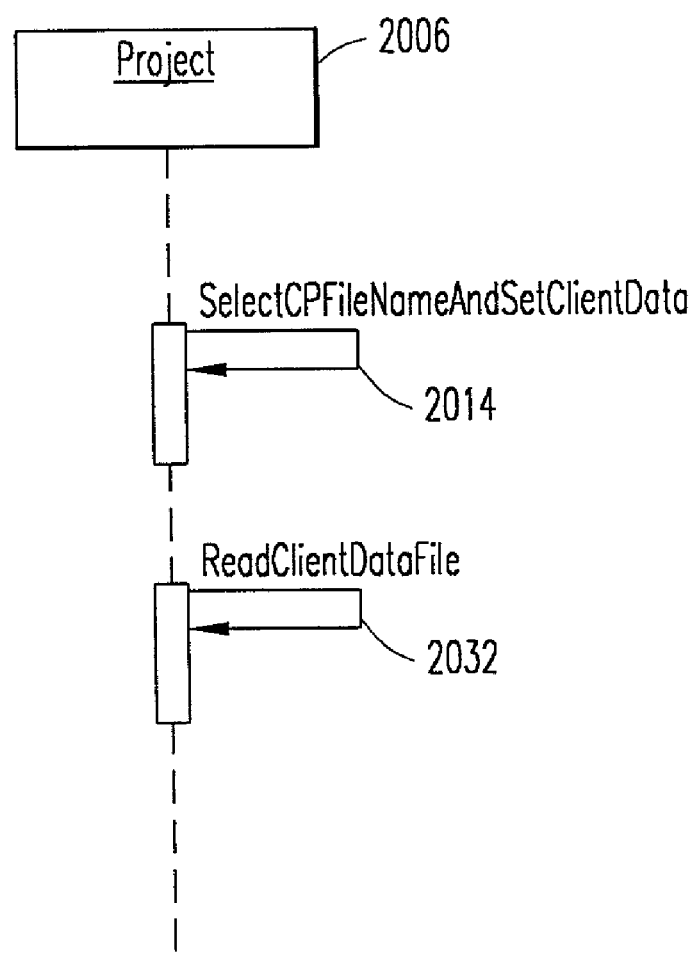
FIGS. 20B-20J are exemplary interaction diagrams for performing various aspects of the interaction diagram of FIG. 20A.

FIG. 20B is an exemplary interaction diagram 2000b that further describes the selecting of the change proposal file name and client data setting at 2014 by the Project instance 2006. The SelectCPFileNameAndSetClientData method 2014 may be used to find the most recent change proposal datafile from a pathname argument. The Project instance 2006 creates an input stream and reads the change proposal data. Once the change proposal data has been read, the Project instance 2006 employs a pattern matching capability. Pattern matching capability is the ability to define patterns of knowledge and then construct patterns of data that can be matched to the patterns of knowledge in various ways to accomplish tasks that would otherwise require extensive algorithmic complexity to create a list of change proposal facts for later use. A client datafile may be read at 2032 to read the change proposal file name and read the client data.

Figure 20C:
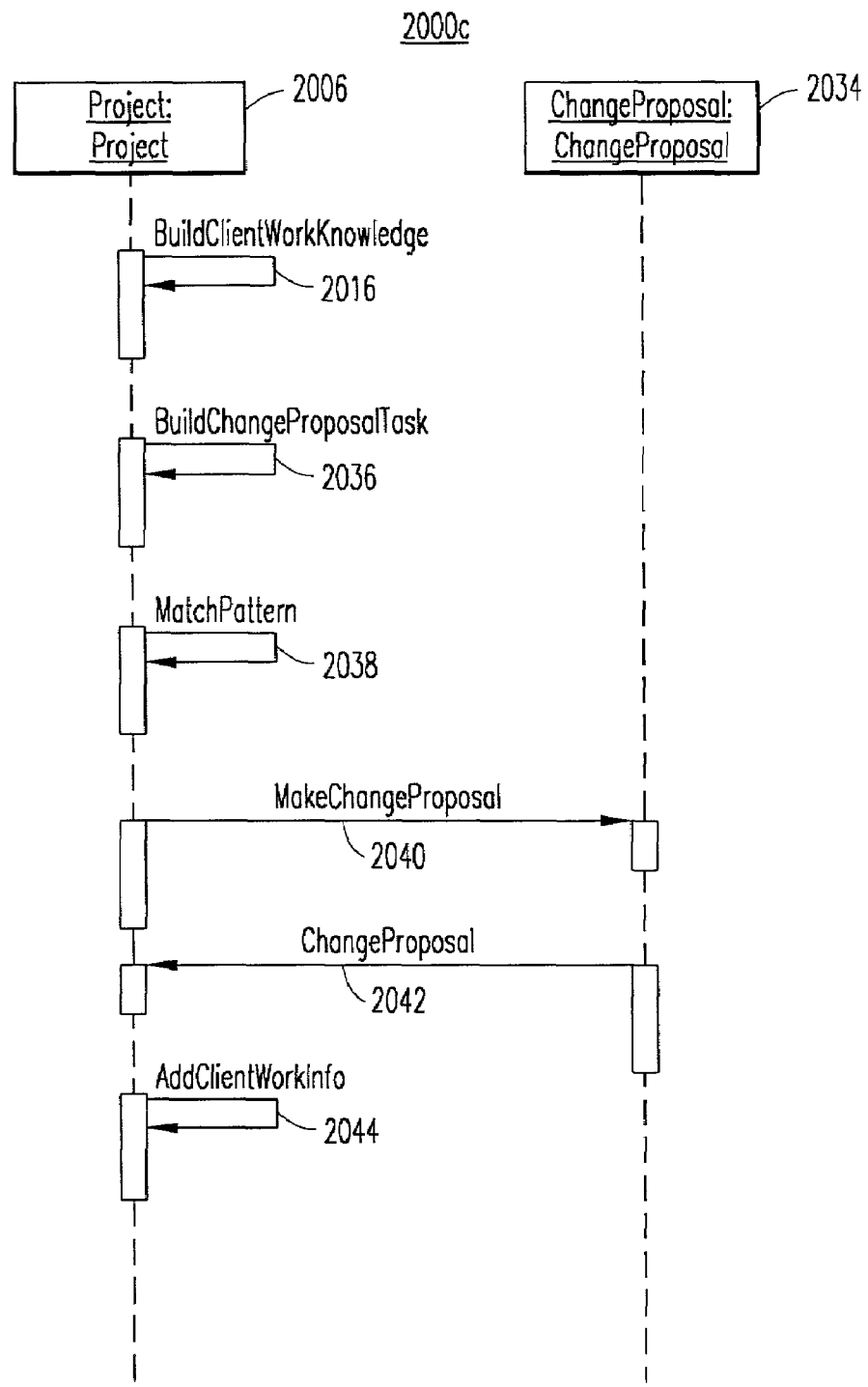

FIG. 20C is an exemplary interaction diagram 2000c that further describes the building of client work knowledge at 2016 by the Project instance 2006. In the execution of the BuildClientWorkKnowledge method 2016, the Project instance 2006 iterates over the list of change proposal facts or data and matches the fact to a change proposal pattern. The change proposal pattern is a pattern of knowledge that represents It change proposal information as it is stored in the change proposal datafile. The change proposal pattern has the following form "("ACCESS" (>dtg)+(>author) (>session) "CHANGE PROPOSAL" "OBJECT" (>oid) (>module)(+r))". A pattern to be used in creating change proposal tasks." When the Project instance 2006 finds a match of the change proposal facts to the change proposal pattern, a change proposal instance 1920 is initiated to set values for the instance variables (e.g., directAttributableTasks 1921 and indirectAttributableTasks 1922). Once the change proposal instance 2034 has completed setting the instance variables, the change proposal instance 2034 may be added to a hash table in the change proposal attribute 1920 of the Project instance 2006. The Project instance 2006 may build a change proposal task at 2036. At 2038, a pattern match may be executed to determine whether a match of a change proposal task exists. At 2040, a change proposal may be generated by the Project instance 2006 communicating with the change proposal instance 2034. The change proposal may be generated by utilizing the change proposal class 1920. The change proposal instance 2034 may communicate back to the Project instance 2006, and client work information may be added to the change proposal class 1920 at 2044.

Figure 20D:
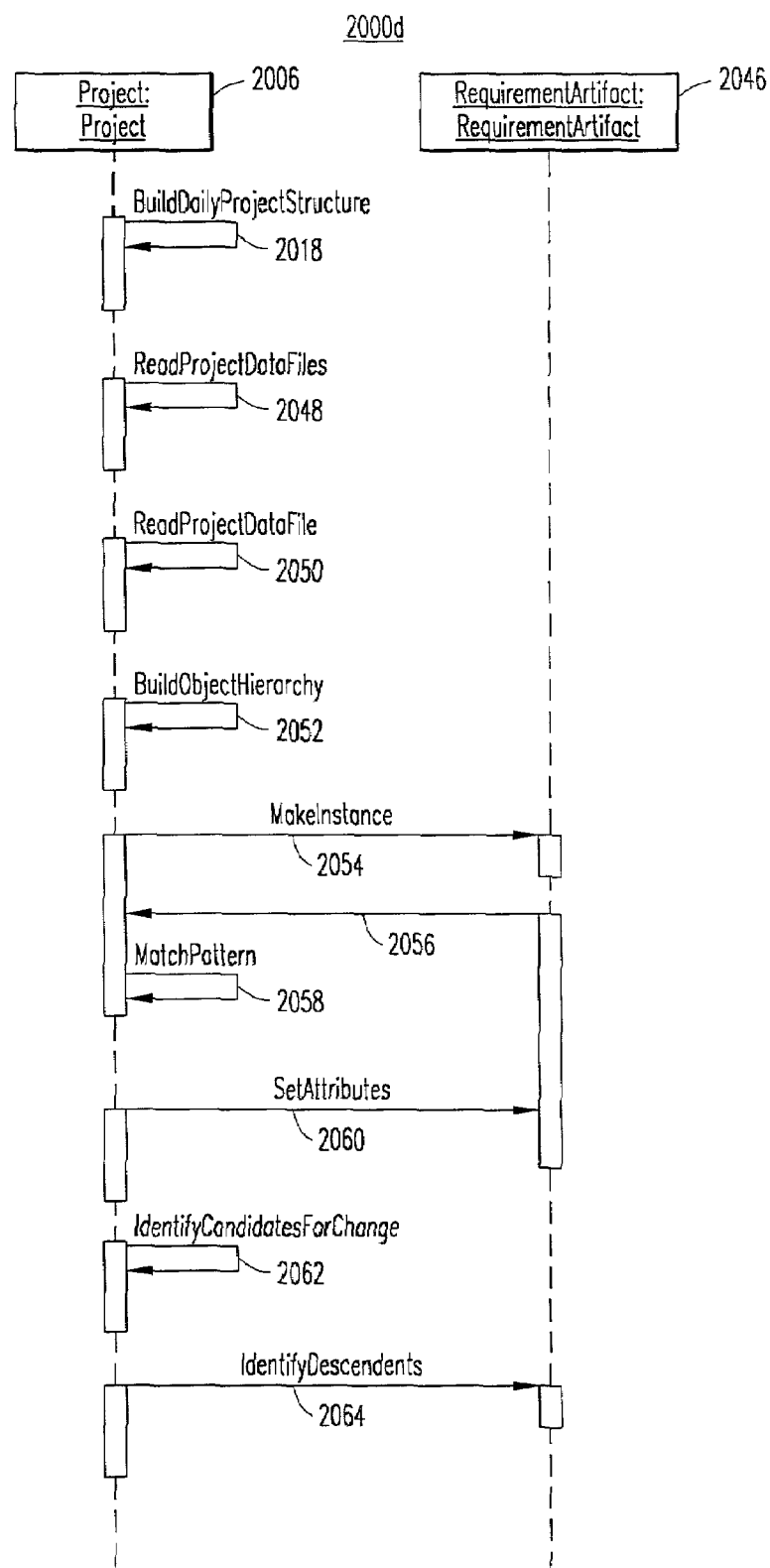

FIG. 20D is an exemplary interaction diagram 2000d that further describes the building of the daily project structure at 2018 by the Project instance 2006. The building of the project structure (e.g., 200b) at 2018 is used to create a replica of the project structure beginning on the first date that a change proposal was submitted and continuing to the current date. The interaction diagram 2000d operates to collect the dates for which there are change proposals, and uses the dates to compose a project datafile name. At 2048, project datafiles are read and the project datafile name may be used to read a particular project datafile at 2050. At 2052, a BuildObjectHierarchy method is utilized to perform a trace on the data read from the project datafile. At 2054, the Project instance 2006 creates an instance 2046 of the RequirementArtifact class 1906. At 2056, the RequirementArtifact instance 2046 replies to the Project instance 2006, and a pattern match may be performed at 2058 to determine whether a pattern of the data matches the RequireArtifact pattern, the results of the matching process are used to set the attributes of a newly created RequirementArtifact object. At 2060, attributes of the RequirementArtifact class 2046 are communicated to the RequirementArtifact instance 2046. At 2062, RequirementArtifacts instances 2046 are identified to determine whether changes based on the change proposals are to be made. At 2064, the RequirementArtifact instances 2046 are sent an IdentifiedDescendants method for causing the hierarchy of the project artifacts to be constructed. The RequirementArtifacts instances 2046 may be stored in a hash table that is maintained in a projectModules attribute of the Project instance 2006.

Figure 20E:
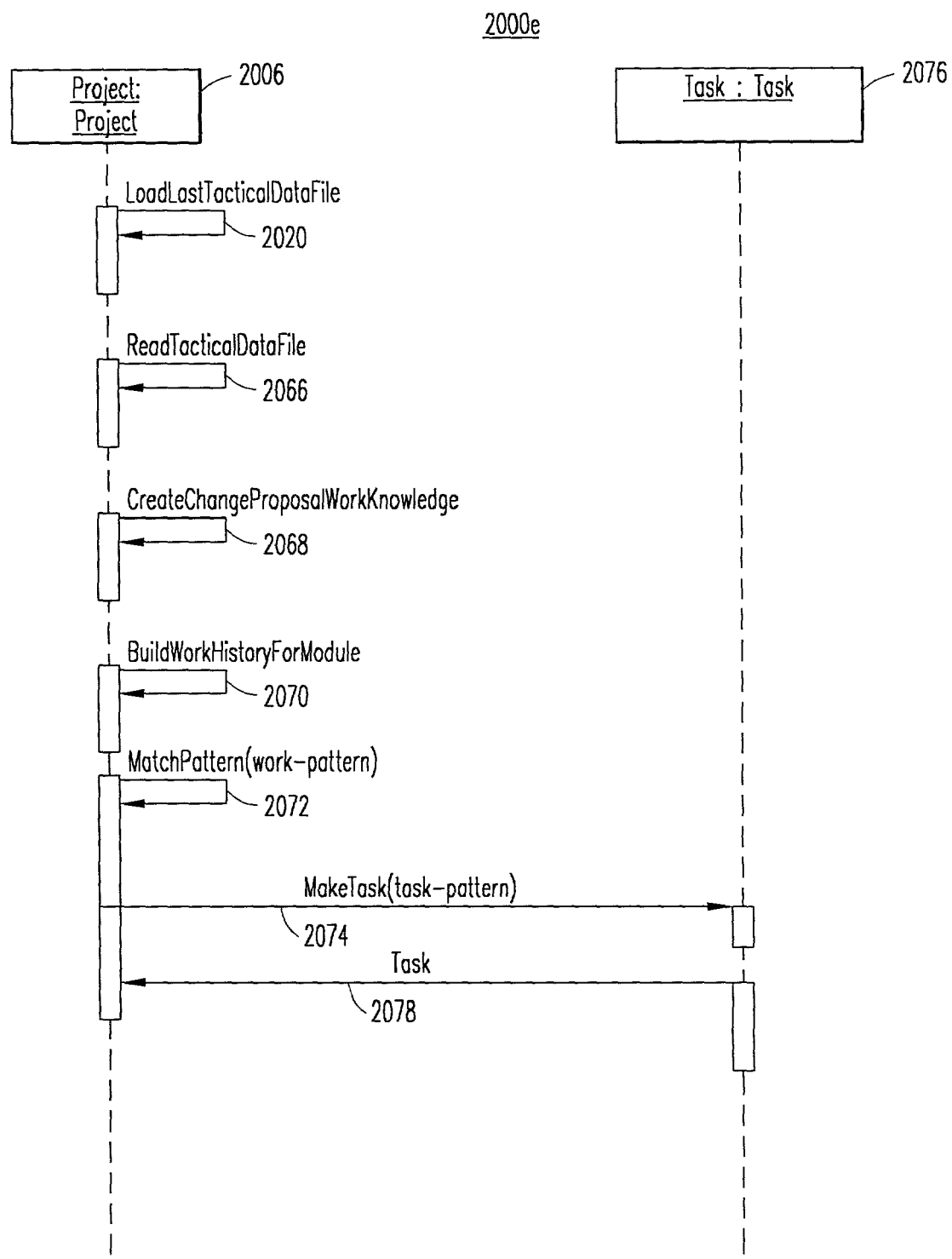

FIG. 20E is an exemplary interaction diagram 2000*d* that further describes the loading of the last tactical datafile at 2020 by the Project instance 2006. The LoadLastTacticalDatafile method 2066 creates a pathname for the directory in which the tactical data are stored. The pathname is used to create a sorted list of datafiles in the directory by reading the tactical datafiles at 2066. At 2068, work knowledge of the change proposals is created, and work history is built at 2070. The last file in the directory contains the most recent tactical data, and is used to create instances of the Task class 1905 using the MatchPattern instance 2072. At 2074, a Task instance 2076 is created and a Task class 1905 having attributes may be returned to the Project instance 2006 at 2078. The new Task instances 2076 are placed in a hash table that is maintained in a projectModules of the Project instance 2006.

Figure 20F:
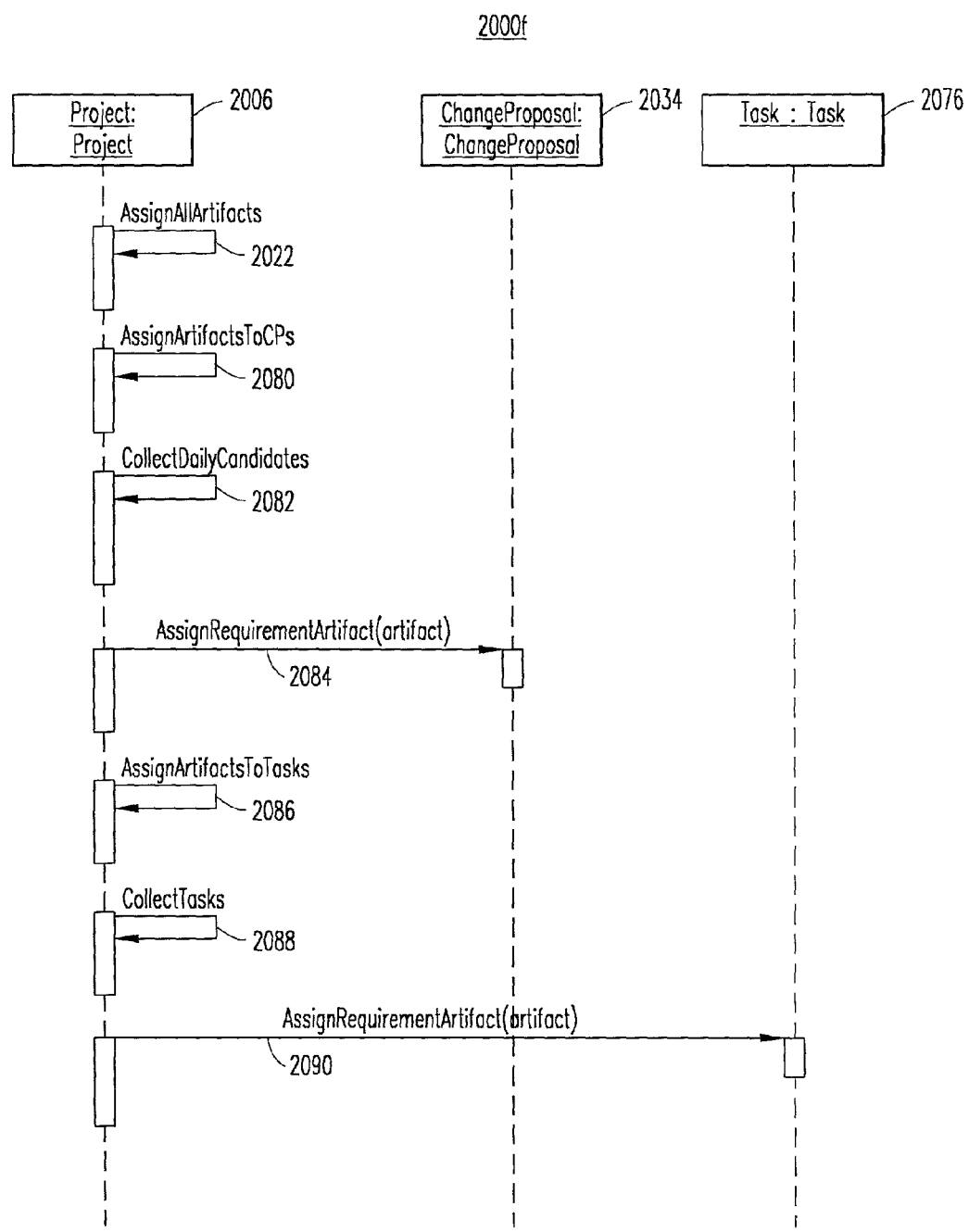

FIG. 20F is an exemplary interaction diagram for assigning the artifacts at 2022 by the Project instance 2006. The Project instance 2006 iterates over the daily change proposals, collects the project structure for the date that the change proposals were submitted, and finds the projectRequirementArtifact 1906 for which the change proposal was submitted. At 2080, artifacts are assigned to the change proposals. At 2082, daily candidates of the RequirementArtifacts 1906 are collected. At 2084, the RequirementArtifact attribute of the change proposal instance 2034 is set to the value of the RequirementArtifact 1906 that was found for the change proposal submitted. The process may be repeated for the task instances 2076 at 2086, 2088, and 2090. The assignment of the artifacts process provides for linking the change proposals to the tasks performed.

Figure 20G:
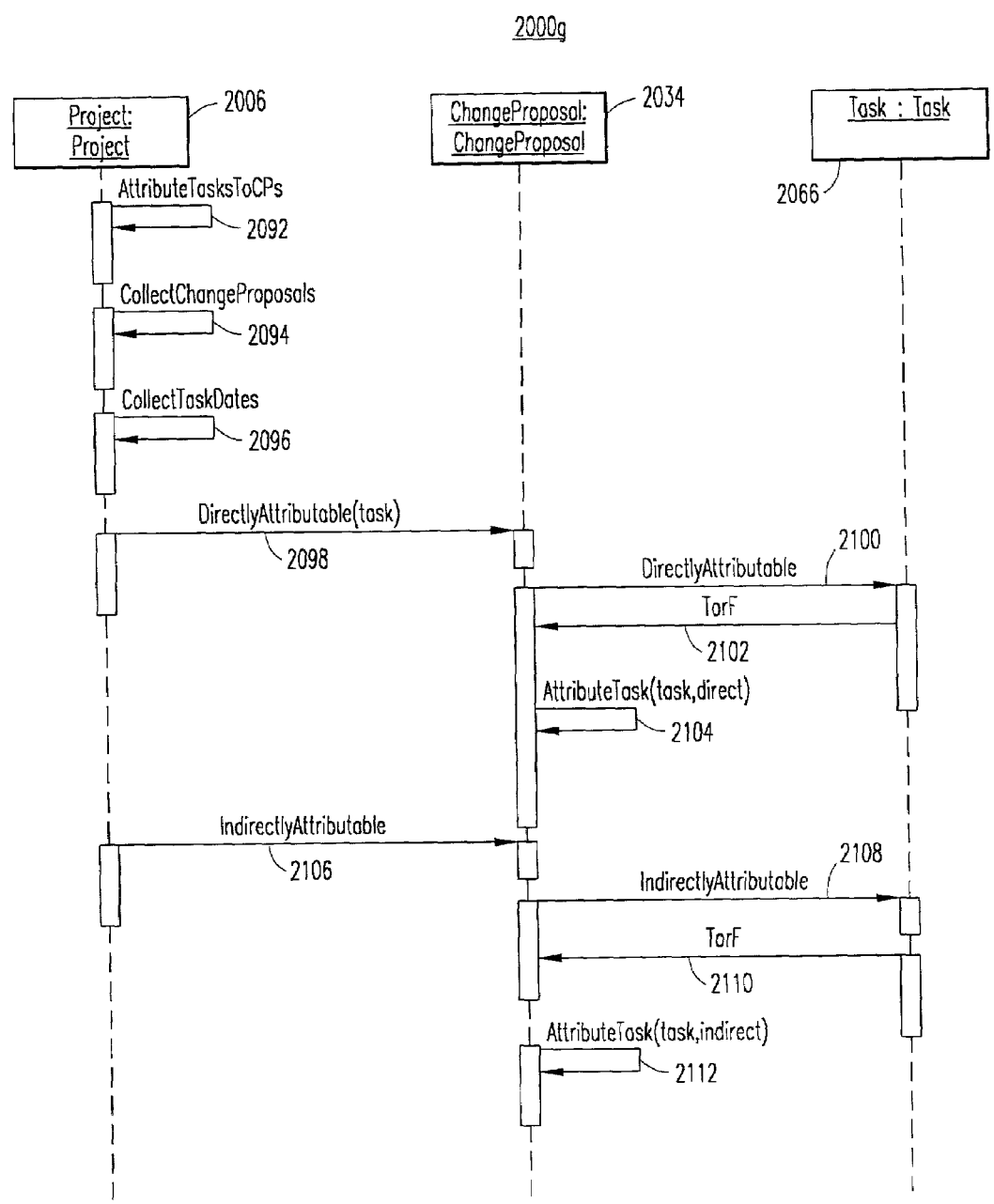

FIG. 20G is an exemplary interaction diagram 2000*g* for attributing tasks to the change proposals at 2092 by the Project instance 2006. Once all the RequirementArtifact instances 2046 have been allocated, the Project instance 2006 causes the change proposal instances 2034 in the change proposal attribute 1920 to find the tasks that are either directly attributable or indirectly attributable to the change proposal. The tasks are recorded in the appropriate change proposal attribute 1920. Change proposals are collected at 2094 and task dates are collected at 2096. A task is directly attributable to a change proposal instance 2034 if the task was performed on the RequirementArtifact 1906 at a point in time after the change proposal 1920 was submitted. At 2098, a DirectlyAttributable method is sent from the Project instance 2006 to the change proposal instance 2034. The change proposal instance 2034 sends the DirectlyAttributable method to the Task instance 2066 at 2100. The Task instance 2066 replies at 2102 a Boolean value to the Change Proposal Instance 2034 to indicate whether the task is or is not directly attributable to the change proposal. An AttributeTask method for the change proposal instance 2034 identifies the task as being directly attributable as defined by the Boolean value.

A task is indirectly attributable to a change proposal if the task was performed at a point in time after the change proposal instance 2034 was submitted and performed on a descendant of the RequirementArtifact 1906 for which the change proposal was submitted. In determining whether the task is indirectly attributable, an InDirectlyAttributable method is communicated from the Project instance 2006 to the Change Proposal Task instance 2034. The IndirectlyAttributable method is communicated from the change proposal instance 2034 to the Task instance 2066 at 2108. A Boolean value may be returned from the Task instance 2066 to the change proposal instance 2034 at 2110 to identify whether the task is IndirectlyAttributable. At 2112, an AttributableTask method identifies whether the task is IndirectlyAttributable based on the Boolean value received by It the change proposal instance 2034.

Figure 20H:
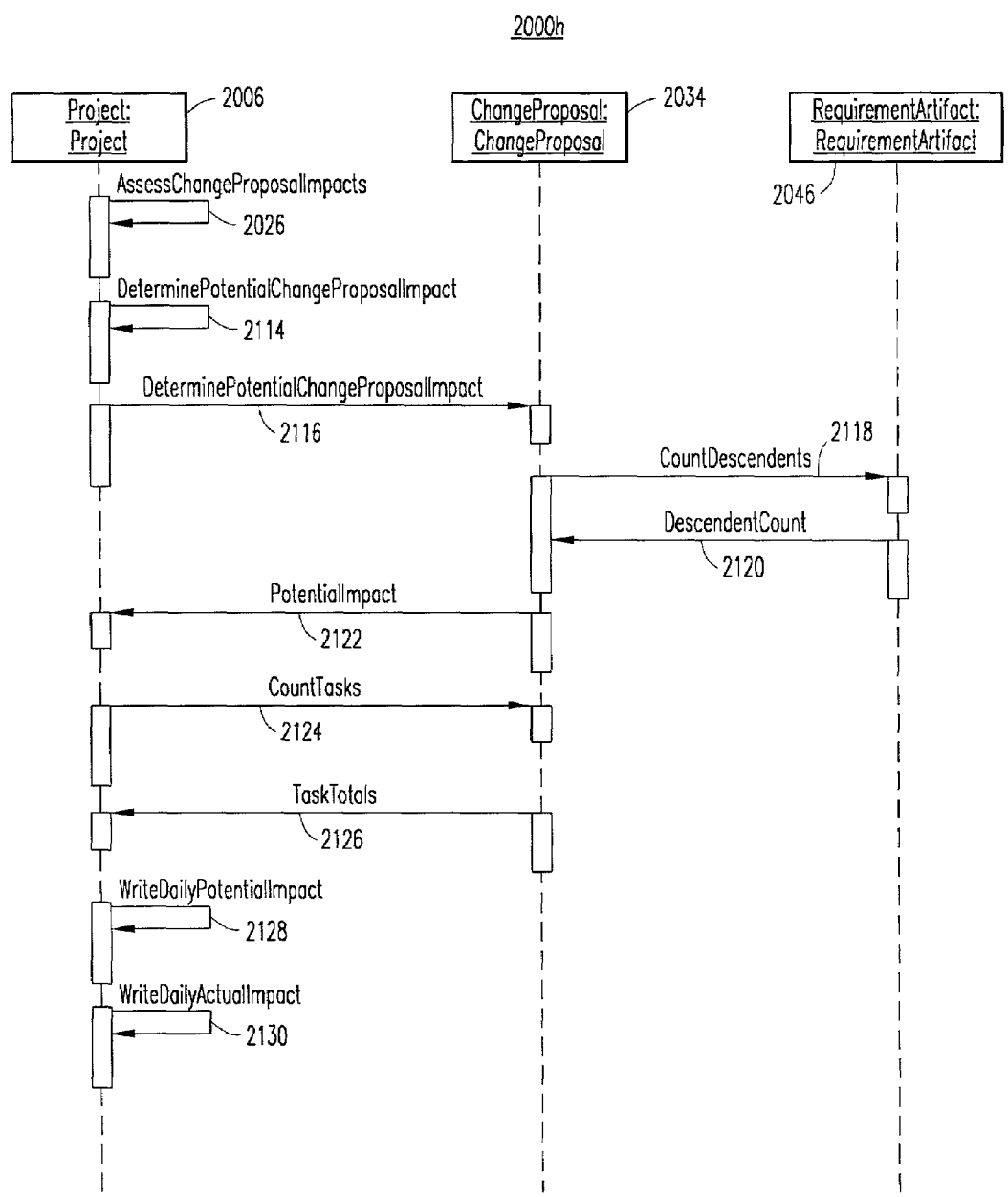

FIG. 20H is an exemplary interaction diagram 2000*h* for assessing the change proposal impacts on the project at 2026 by the Project instance 2006. The processes of FIGS. 20B-20J establish the framework of knowledge within which the change proposal impacts may be assessed. At 2014, potential change proposal impact is determined by the Project instance 2006. At 2116, a DeterminePotentialChangeProposalImpact method is communicated from the Project instance 2006 to the change proposal instance 2034. The change proposal instance 2034 issues a CountDescendants method 2118 to the RequirementArtifact instance 2046. The RequirementArtifact instance 2046 returns a descendant count at 2120 to the change proposal instance 2034, which, in turn, returns the potential impact to the Project instance 2006 at 2122. The Project instance 2006 requests that the change proposal instance 2034 count the number of tasks performed at 2124. The total number of tasks are returned from the change proposal instance 2034 to the Project instance 2006 at 2126. At 2128, the daily potential impact is written or stored and the daily actual impact is written or stored at 2130. It should be understood that the potential impact is determined by counting the total number of descendants of the RequirementArtifact 1906 for which the change proposal was submitted. Change proposals have an actual impact that is represented by the total number of directly and indirectly attributable tasks assigned to the change proposal.

Figure 20I:
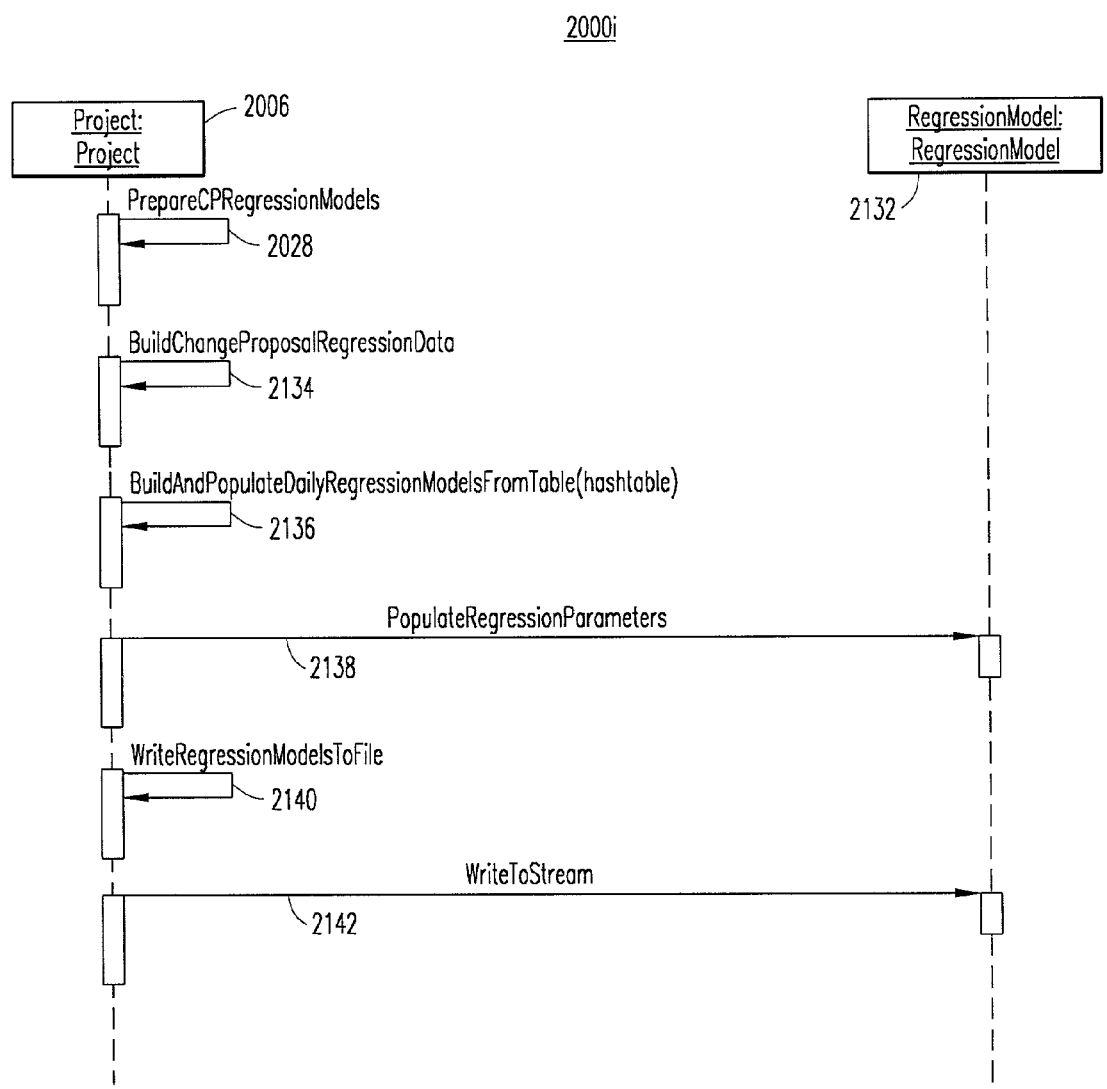

FIG. 20I is an exemplary interaction diagram 2000*i* for preparing change proposal regression models at 2028 by the Project instance 2006. At 2134, change proposal regression data is built by the Project instance 2006. Daily regression models are built and populated using the hash table at 2136. At 2138, the Project instance 2006 communicates a PopulateRegressionParameters method to the RegressionModel instance 2132. At 2138, the regression models are populated with parameters (e.g., independent and dependent variables). The regression models are written to a datafile or repository at 2140. At 2142, the Project instance 2006 communicates to the RegressionModel instance 2132 a WriteToStream method, which implements a modified form of persistence for the RegressionModel class, writing the slope, intercept, correlation coefficient {r} and the coefficient of determination {R-squared} to a text file for later use.

Figure 20J:
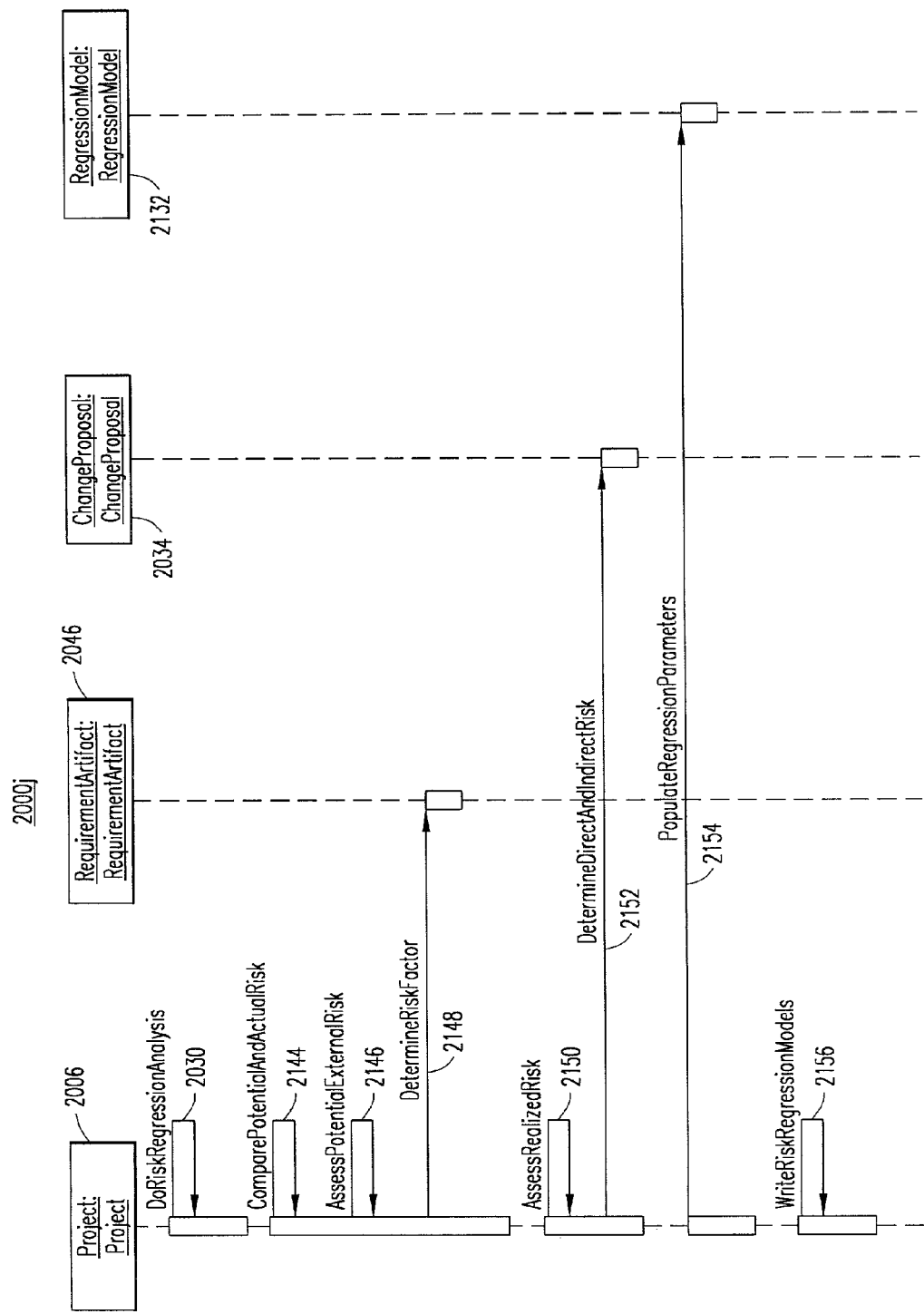

FIG. 20J is an exemplary interaction diagram 2000*j* which is used to perform a risk regression analysis at 2030 by the Project instance 2006. Three instances of the RegressionModel class are created for each day of the project duration following the initial date on which the change proposal was submitted, including: (1) the RegressionModel instances provide the capability to model the number of daily indirectly attributable tasks in relation to the number of daily change proposals, (2) the number of daily directly attributable tasks in relation to the number of change proposals, and (3) the number of indirectly attributable tasks in relation to the number of directly attributable tasks, for example. At 2134, change proposal regression model may be built by the Project instance 2006. At 2144, potential and actual risk is compared by the Project instance 2006. At 2146, potential external risk is assessed. Risk factor is determined at 2148 by the Project instance 2006 communicating to the RequirementArtifact instance 2046. At 2150, realized risk is assessed by the Project instance 2006. At 2152, the Project instance 2006 requests the change proposal instance 2034 to determine direct and indirect risk. At 2154, the Project instance 2006 requests the RegressionModel instance 2132 to populate regression parameters. The risk regression models are stored at 2156 by the Project instance 2006.

It should be understood that the exemplary embodiments for implementing the principles of the present invention using the interaction diagrams of FIGS. 20A-20J may be performed using the object oriented structures as shown, but may also be performed by using traditional programming methods as well. In that regard, the principles of the present invention are not dependent upon the particular data structures or classes.

The previous description is of an embodiment for implementing the principles of the present invention, and the scope of the invention should not necessarily be limited by this description. The scope of the present invention is instead defined by the following claims.

What is claimed is:

1. A method for assessing risk on a project associated with at least one change proposal directed toward the project, the project being developed by a service provider for a client, said method comprising:
   receiving, from the client by the service provider, the at least one change proposal directed toward the project during a life cycle of the project, the change proposal requesting at least one amendment to be performed to the project being developed by the service provider;
   identifying, based on the at least one amendment request, at least one artifact of the project to be potentially affected upon the change proposal being adopted; and
   generating at least one metric indicative of the potential effects on the project based on said identifying the at least one artifact, the at least one metric providing an objective risk assessment for the service provider to provide the client and for allowing the service provider and the client to assess both direct and indirect risk before the at least one change proposal is adopted and to objectively make an informed business decision as to whether or not to adopt the at least one change proposal.

2. The method according to claim 1, wherein the at least one metric includes a statistical value.

3. The method according to claim 1, wherein said generating includes performing a regression analysis.

4. The method according to claim 1, wherein the service provider is at least one of a consultant and a contractor.

5. The method according to claim 1, wherein the project is at least one of a document and a product.

6. The method according to claim 1, wherein said identifying includes determining an artifact to be amended.

7. The method according to claim 6 wherein said identifying the at least one artifact includes counting descendants of the artifact to be amended.

8. The method according to claim 1, wherein the at least one metric includes a numerical representation of at least one of direct and indirect artifacts affected by the change proposal.

9. The method according to claim 1, wherein the project is a requirements specification.

10. A system for assessing risk on a project associated with at least one change proposal directed toward the project, the project being developed by a service provider for a client, said system comprising:
    means for receiving, from the client by the service provider, the at least one change proposal directed toward the project during a life cycle of the project, the at least one change proposal requesting at least one amendment to be performed to the project being developed by the service provider;
    means for identifying, based on the at least one amendment request, at least one artifact of the project to be potentially affected upon the change proposal being adopted; and
    means for generating at least one metric indicative of the potential effects on the project based on said identifying the at least one artifact, the at least one metric providing an objective risk assessment for the service provider to provide the client and for allowing the service provider and the client to assess both direct and indirect risk before the at least one change proposal is adopted and to objectively make an informed business decision as to whether or not to adopt the at least one change proposal.

11. The system according to claim 10, wherein the at least one metric includes a statistical value.

12. The system according to claim 10, wherein the means for generating includes performing a regression analysis.

13. The system according to claim 10, wherein the service provider is at least one of a consultant and a contractor.

14. The system according to claim 10, wherein the project is at least one of a document and a product.

15. The system according to claim 10, wherein the project is a requirements specification.

16. The system according to claim 10, wherein the means for identifying includes determining an artifact to be amended.

17. The system according to claim 16, wherein the means for identifying the at least one artifact includes counting descendants of the artifact to be amended.

18. The system according to claim 10, wherein the at least one metric includes a numerical representation of at least one of direct and indirect artifacts affected by the change proposal.

19. A computer-readable medium having stored thereon sequences of instructions, the sequences of instructions, when executed by a processor, causes the processor to:
    receive, from a client by a service provider, at least one change proposal directed toward a project during a life cycle of the project, the project being developed by the service provider for the client, the at least one change proposal requesting at least one amendment to be performed to the project;
    identify, based on the at least one amendment request, at least one artifact of the project to be potentially affected upon the change proposal being adopted; and
    generate at least one metric indicative of the potential effects on the project based on said identifying the at least one artifact, the at least one metric providing an objective risk assessment for the service provider to provide the client and for allowing the service provider and the client to assess both direct and indirect risk before the at least one change proposal is adopted and to objectively make an informed business decision as to whether or not to adopt the at least one change proposal.

* * * * *

UNITED STATES PATENT AND TRADEMARK OFFICE
CERTIFICATE OF CORRECTION

PATENT NO. : 7,313,531 B2  Page 1 of 1
APPLICATION NO. : 09/998474
DATED : December 25, 2007
INVENTOR(S) : Oscar A. Chappel et al.

It is certified that error appears in the above-identified patent and that said Letters Patent is hereby corrected as shown below:

On the Title Page, Item (56)
IN REFERENCES CITED, U.S. PATENT DOCUMENTS

Please replace      [2003/0206379] with --2003/0208379--

On the Title Page, Item (56)
IN REFERENCES CITED, OTHER PUBLICATIONS

Please replace      [Galzauskas] with --Gaizauskos--
    Please replace      [Arnami] with --Amami--
    Please replace      [Belvao] with --Beiyao--

COLUMN 14, LINE 6

Please delete      [It] at the end of the line

Signed and Sealed this

Twelfth Day of August, 2008

JON W. DUDAS
*Director of the United States Patent and Trademark Office*